United States Patent
Doi et al.

(10) Patent No.: US 10,297,179 B2
(45) Date of Patent: May 21, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Shouichi Doi, Kanagawa (JP);
Masayuki Chatani, Tokyo (JP);
Atsushi Ishihara, Tokyo (JP);
Yoshinori Kurata, Ibaraki (JP);
Masayuki Takada, Tokyo (JP);
Masahiro Morita, Kanagawa (JP);
Yoshiki Takeoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/533,731

(22) PCT Filed: Nov. 10, 2015

(86) PCT No.: PCT/JP2015/081534
§ 371 (c)(1),
(2) Date: Jun. 7, 2017

(87) PCT Pub. No.: WO2016/125359
PCT Pub. Date: Aug. 11, 2016

(65) Prior Publication Data
US 2017/0330495 A1    Nov. 16, 2017

(30) Foreign Application Priority Data
Feb. 3, 2015    (JP) .................................. 2015-019459

(51) Int. Cl.
*G09G 3/20* (2006.01)
*G09G 3/00* (2006.01)
(Continued)

(52) U.S. Cl.
CPC ............. *G09G 3/001* (2013.01); *G03B 21/14* (2013.01); *G06F 3/00* (2013.01); *G06T 3/0093* (2013.01);
(Continued)

(58) Field of Classification Search
None
See application file for complete search history.

(56) References Cited

U.S. PATENT DOCUMENTS 8,539,560 B2 * 9/2013 Angaluri ............ H04N 9/3194
434/314
8,837,778 B1 * 9/2014 Chang ..................... G06T 7/251
382/103

(Continued)

FOREIGN PATENT DOCUMENTS

EP       2693366 A2    2/2014

OTHER PUBLICATIONS

Aug. 9, 2018, European Search Report issued for related EP application No. 15881176.0.

*Primary Examiner* — Ryan M Gray
(74) *Attorney, Agent, or Firm* — Paratus Law Group, PLLC

(57) ABSTRACT

There is provided an information processing apparatus, an information processing method, and a program capable of projecting an image to an appropriate projection destination while reducing work of a user in projection of an image, the information processing apparatus including: a 3-dimensional information acquisition unit configured to acquire 3-dimensional information indicating disposition of an object; and a projection control unit configured to decide a projection region to which an image is projected in a space in which the object is disposed on the basis of the 3-dimensional information acquired by the 3-dimensional informa- (Continued)

tion acquisition unit, an information processing method, and a program.

17 Claims, 17 Drawing Sheets

(51) Int. Cl.
*G06F 3/00* (2006.01)
*G06T 3/00* (2006.01)
*G06T 5/00* (2006.01)
*G06T 7/73* (2017.01)
*G09G 5/00* (2006.01)
*H04N 5/74* (2006.01)
*G03B 21/14* (2006.01)
*H04N 13/271* (2018.01)

(52) U.S. Cl.
CPC ............... *G06T 5/006* (2013.01); *G06T 7/74* (2017.01); *G09G 3/20* (2013.01); *G09G 5/00* (2013.01); *H04N 5/74* (2013.01); *G06T 2207/10028* (2013.01); *G09G 2320/08* (2013.01); *G09G 2354/00* (2013.01); *H04N 13/271* (2018.05)

(56) References Cited

U.S. PATENT DOCUMENTS

| | | |
|---|---|---|
| 9,336,607 B1 * | 5/2016 | Chang ..................... G06T 7/73 |
| 9,374,554 B1 * | 6/2016 | Poulad ............... H04N 5/23238 |
| 9,451,245 B1 * | 9/2016 | Darling .............. H04N 13/0459 |
| 2007/0115396 A1 | 5/2007 | Matsuda |
| 2008/0068566 A1 * | 3/2008 | Denoue ................ G03B 21/006 |
| | | 353/122 |
| 2009/0207322 A1 | 8/2009 | Mizuuchi et al. |
| 2011/0321143 A1 | 12/2011 | Angaluri et al. |
| 2013/0044193 A1 | 2/2013 | Kulkarni |
| 2013/0076789 A1 * | 3/2013 | Majumder ........... H04N 9/3147 |
| | | 345/633 |
| 2013/0321312 A1 * | 12/2013 | Higashi .................. G06F 3/041 |
| | | 345/173 |

* cited by examiner

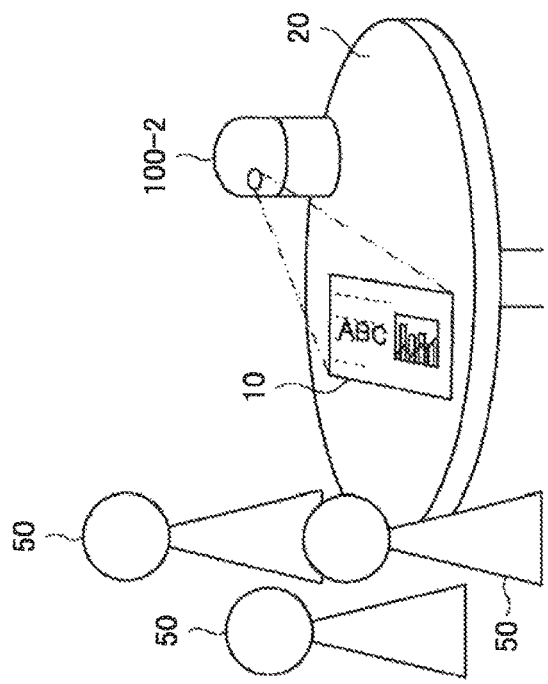
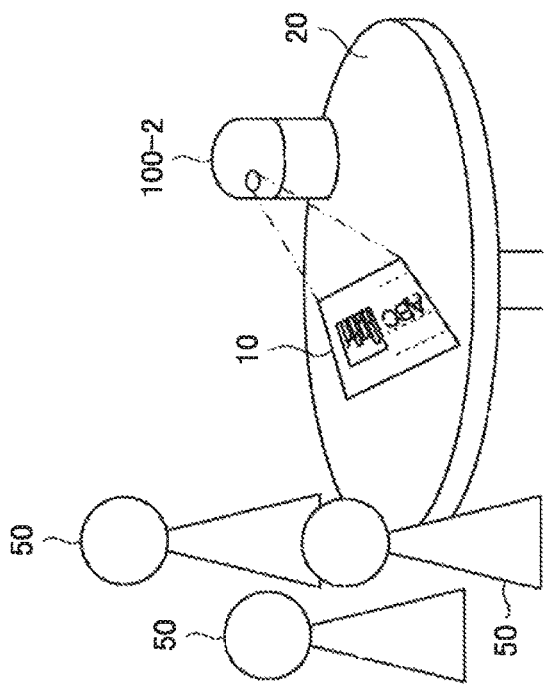
FIG.11

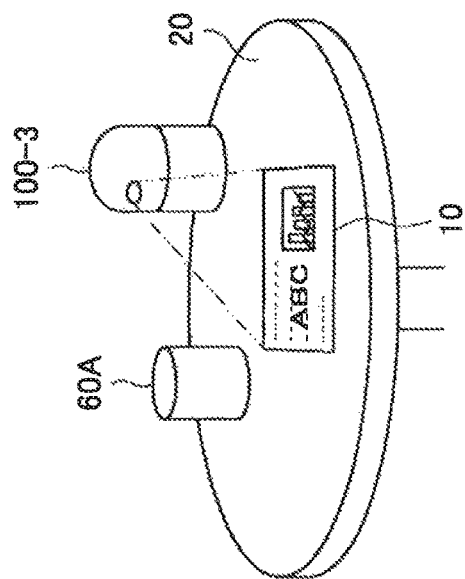
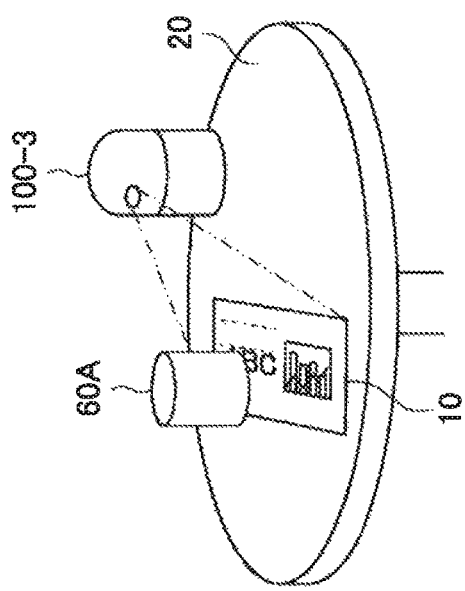
FIG.12

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/081534 (filed on Nov. 10, 2015) under 35 U.S.C. § 371, which claims priority to Japanese Patent Application No. 2015-019459 (filed on Feb. 3, 2015), which are all hereby incorporated by reference in their entirety.

TECHNICAL FIELD

The present disclosure relates to an information processing apparatus, an information processing method, and a program.

BACKGROUND ART

In recent years, various projection apparatuses have been developed with advances in image projection technologies. In general, when projection apparatuses are used, users perform work of adjusting projection directions, focuses, and the like. On the other hand, projection apparatuses that assist with adjustment work have been proposed.

For example, Patent Literature 1 discloses an invention related to a projector including an actuator for rotation, an actuator for height adjustment, and an actuator for movement which can be manipulated by a remote controller. According to this invention, a user can perform adjustment work of a projector by manipulating the remote controller without manually adjusting the projector.

In addition, Patent Literature 2 discloses an invention related to a robot that selects a projection destination of an image from a wall surface, a handy screen, or the palm of a hand and projects the image to the selected projection destination.

CITATION LIST

Patent Literature

Patent Literature 1: JP 2013-80087A
Patent Literature 2: JP 2005-59186A

DISCLOSURE OF INVENTION

Technical Problem

However, in the projector disclosed in Patent Literature 1, the user decides a projection destination of an image and performs work of installing the projector to face the projection destination, and thus the work is troublesome in some cases. In addition, in Patent Literature 2, content of a process of selecting a projection destination is not specifically disclosed, and thus further improvement and development are necessary.

Accordingly, the present disclosure proposes a novel and improved information processing apparatus, a novel and improved information processing method, and a novel and improved program capable of projecting an image to an appropriate projection destination while reducing work of a user in projection of an image.

Solution to Problem

According to the present disclosure, there is provided an information processing apparatus including: a 3-dimensional information acquisition unit configured to acquire 3-dimensional information indicating disposition of an object; and a projection control unit configured to decide a projection region to which an image is projected in a space in which the object is disposed on the basis of the 3-dimensional information acquired by the 3-dimensional information acquisition unit.

Further, according to the present disclosure, there is provided an information processing method including: acquiring, by a 3-dimensional information acquisition unit, 3-dimensional information indicating disposition of an object; and deciding a projection region to which an image is projected in a space in which the object is disposed on the basis of the 3-dimensional information acquired by the 3-dimensional information acquisition unit.

Further, according to the present disclosure, there is provided a program causing a computer to perform: a 3-dimensional information acquisition function of acquiring 3-dimensional information indicating disposition of an object; and a projection control function of deciding a projection region to which an image is projected in a space in which the object is disposed on the basis of the 3-dimensional information acquired by the 3-dimensional information acquisition function.

Advantageous Effects of Invention

According to the present disclosure described above, there are provided the information processing apparatus, the information processing method, and the program capable of projecting an image to an appropriate projection destination while reducing work of a user in projection of an image. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram illustrating an example of a projected image correction process in the information processing apparatus according to a fourth modification example of the embodiment.

FIG. 12 is a diagram illustrating a change example of a projection form in an information processing apparatus according to a third embodiment of the present disclosure.

MODE(S) FOR CARRYING OUT THE INVENTION

Figure 1:
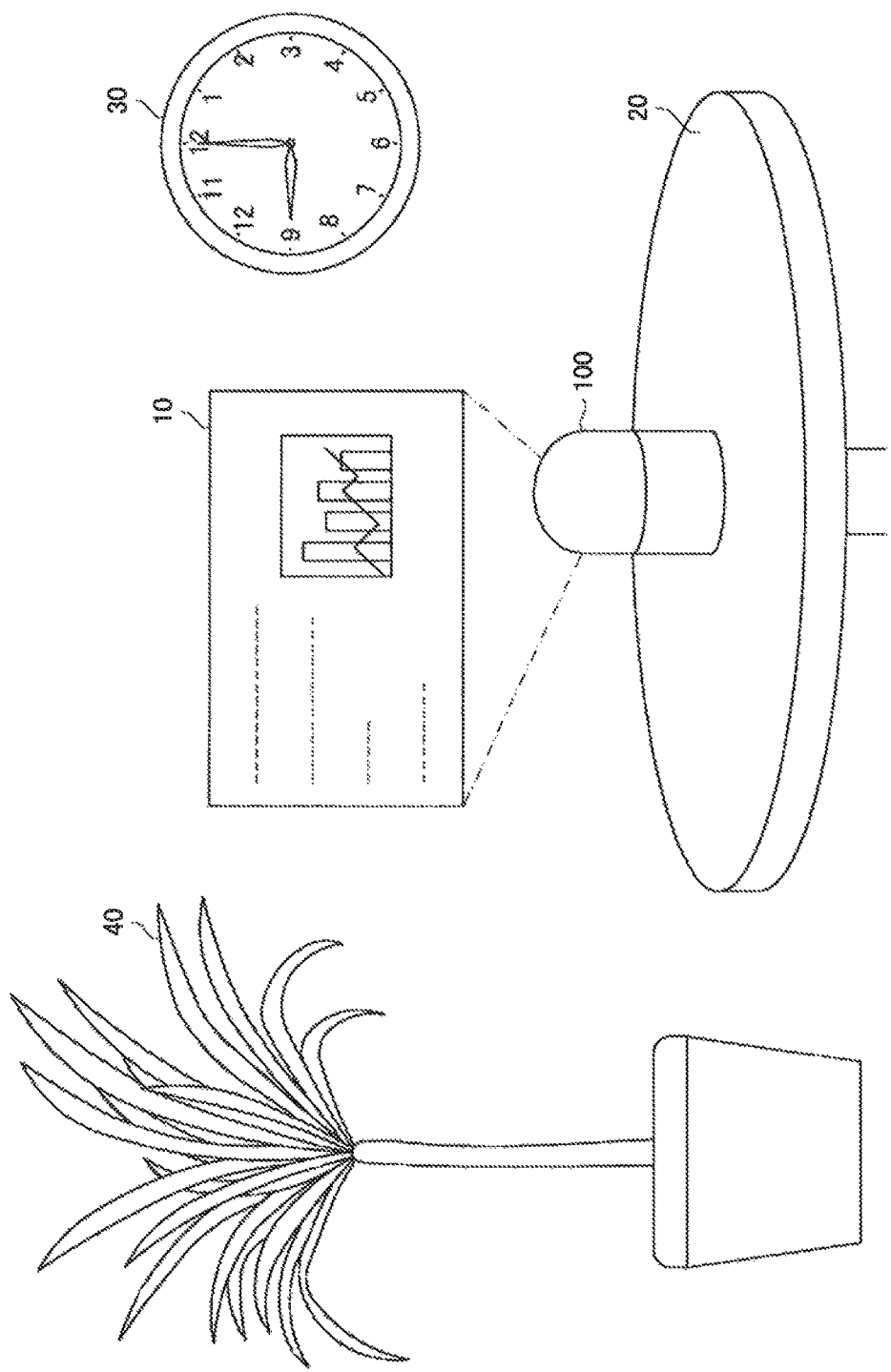
FIG. 1 is a diagram for describing an overview of an information processing apparatus according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. Overview of information processing apparatus according to embodiment of the present disclosure
2. First embodiment (example in which projection region is decided on basis of plane)
3. Second embodiment (example in which projection region is decided on basis of user information)
4. Third embodiment (example in which projection form is changed)
5. Fourth embodiment (example in which plane is searched for with movement)
6. Hardware configuration of information processing apparatus according to embodiment of present disclosure
7. Conclusion <1. Overview of Information Processing Apparatus According to Embodiment of the Present Disclosure>

First, an overview of an information processing apparatus according to an embodiment of the present disclosure will be described with reference to FIG. 1. FIG. 1 is a diagram for describing an overview of an information processing apparatus 100 according to the embodiment of the present disclosure.

The information processing apparatus 100 according to the embodiment of the present disclosure has a projection function and an adjustment function. Specifically, the projection function is a function of projecting an image and the adjustment function is a function of adjusting a projection direction, a focus, and the like. Therefore, the information processing apparatus 100 can project an image to a screen or the like and adjust a projection direction or the like of the image.

For example, as illustrated in FIG. 1, the information processing apparatus 100 is installed on a table 20 and projects an image 10 to a wail surface. In addition, the information processing apparatus 100 adjusts a projection direction, a focus, and the like of the image 10.

In general, for an information processing apparatus that has a projection function, a user performs work of deciding a projection destination of an image and setting a projection direction of the information processing apparatus toward the projection destination. Therefore, when the projection destination is changed, the user has to set a projection direction of the information processing apparatus again, and thus the work is troublesome in some cases.

Accordingly, the information processing apparatus 100 according to the embodiment of the present disclosure acquires 3-dimensional information indicating disposition of an object and decides a projection region to which an image is projected in a space in which the object is disposed on the basis of the acquired 3-dimensional information.

For example, the information processing apparatus 100 first acquires 3-dimensional information in the periphery the information processing apparatus 100. Then, the information processing apparatus 100 ascertain objects disposed in the periphery of the information processing apparatus 100, for example, a clock 30 and an ornamental plant 40 illustrated in FIG. 1, on the basis of the 3-dimensional information. Subsequently, the information processing apparatus 100 displays the image 10 at a position not overlapping with the ascertained objects, for example, a wall surface between the clock 30 and the ornamental plant 40 illustrated in FIG. 1.

In this way, the information processing apparatus 100 according to the embodiment of the present disclosure acquires 3-dimensional information indicating disposition of an object and decides a projection region to which an image is projected in a space in which the object is disposed on the basis of the 3-dimensional information. Therefore, by projecting the image while avoiding the object, it is possible to project the image to the appropriate projection destination while reducing work of a user in projection of the image. Also, to facilitate the description, numbers corresponding to embodiments are suffixed to the information processing apparatuses 100 according to first to fourth embodiments, such as the information processing apparatuses 100-1 to 100-4, to distinguish the information processing apparatuses 100 from each other.

<2. First Embodiment (Example in Which Projection Region is Decided on Basis of Plane)>

The overview of the information processing apparatus 100 according to the embodiment of the present disclosure has been described above. Next, an information processing apparatus 100-1 according to a first embodiment of the present disclosure will be described. The information processing apparatus 100-1 specifies a plane from 3-dimensional information and decides a projection region to which an image is projected on the basis of the specified plane.

<2-1. Configuration of Apparatus>

First, the configuration of the information processing apparatus 100-1 according to the first embodiment of the present disclosure will be described with reference to FIG.

Figure 2:
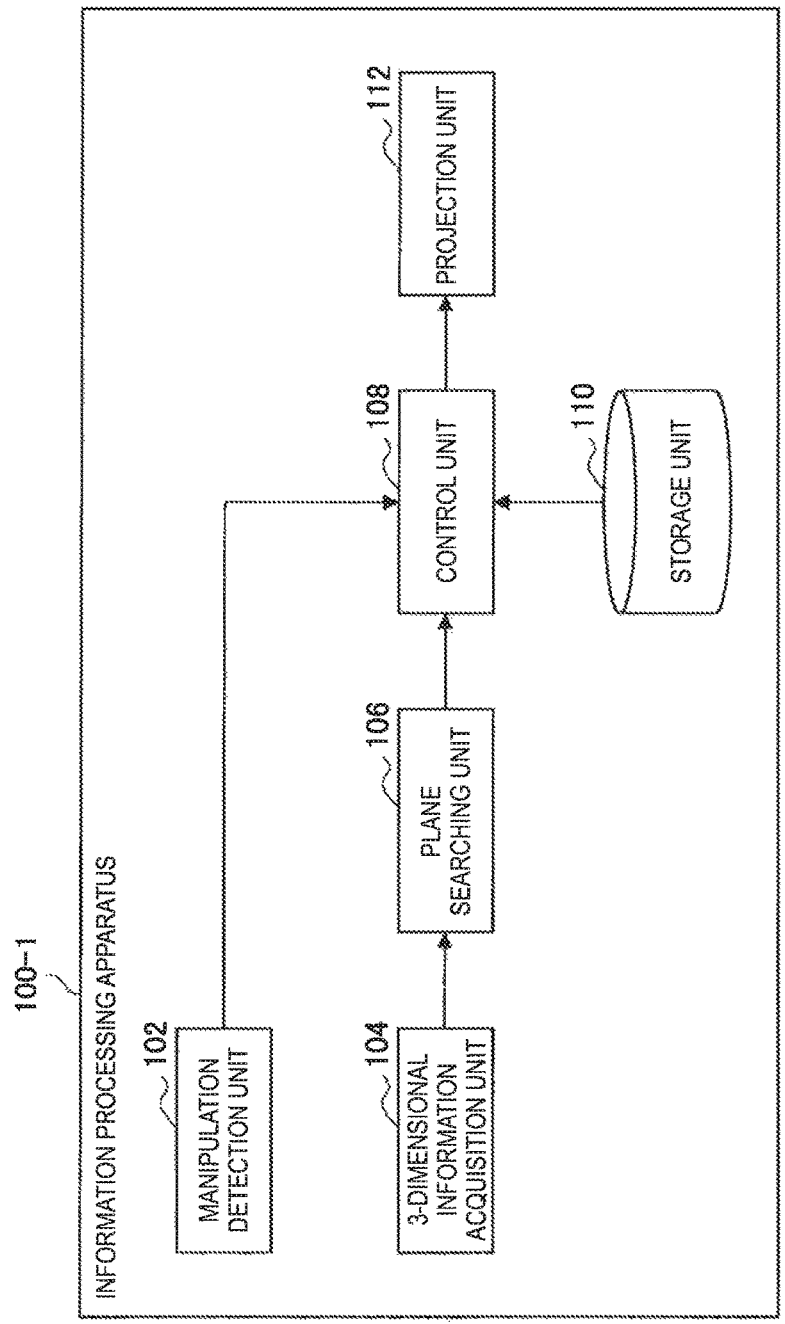
FIG. 2 is a block diagram illustrating a schematic functional configuration of an information processing apparatus according to a first embodiment of the present disclosure.

2. FIG. 2 is a block diagram illustrating a schematic functional configuration of the information processing apparatus 100-1 according to the embodiment.

As illustrated in FIG. 2, the information processing apparatus 100-1 includes a manipulation detection unit 102, a 3-dimensional information acquisition unit 104, a plane searching unit 106, a control unit 108, a storage unit 110, and a projection unit 112.

The manipulation detection unit 102 detects a user manipulation on the information processing apparatus 100-1. Specifically, the manipulation detection unit 102 detects a manipulation on the information processing apparatus 100-1 and generates manipulation information indicating the detected manipulation. Then, the manipulation detection unit 102 supplies the generated manipulation information to the control unit 108. For example, the manipulation detection unit 102 detects an input manipulation by a motion such as a button press, a touch, or a gesture or an input manipulation by audio and generates manipulation information indicating the detected manipulation.

The 3-dimensional information acquisition unit 104 acquires 3-dimensional information indicating disposition of an object. Specifically, the 3-dimensional information acquisition unit 104 acquires the 3-dimensional information in a space in the periphery of the information processing apparatus 100-1. For example, the 3-dimensional information acquisition unit 104 generates 3-dimensional information, for example, a distance image (depth map), from an image obtained through imaging by a stereo camera separately included in the information processing apparatus 100-1. Also, the 3-dimensional information acquisition unit 104 may be a distance sensor (depth sensor) using infrared rays, visible light, ultrasonic waves, or the like.

The plane searching unit 106 serves as a part of a projection control unit and specifies a plane on the basis of the 3-dimensional information. Specifically, the plane searching unit 106 specifies a plane of an object present in the periphery of the information processing apparatus 100-1 and indicated by the 3-dimensional information. For example, the plane searching unit 106 first calculates a projectable range of the projection unit 112. Then, the plane searching unit 106 calculates unevenness from a depth included in the 3-dimensional information in the projectable range and specifies a continuous region in which the calculated unevenness is a depth or a height equal to or less than a threshold as a plane. Also, a plurality of planes can be specified.

The control unit 108 serves as a part of a projection control unit and decides a projection region to which an image is projected on the basis of the 3-dimensional information. Specifically, the control unit 108 decides a projection region from the plane specified from the 3-dimensional information by the plane searching unit 106. More specifically, the control unit 108 decides a projection region on the basis of the size of the plane specified by the plane searching unit 106. In addition, the control unit 108 may decide a plane specified earlier than other specified planes as a projection region.

For example, the control unit 108 decides a plane satisfying a condition in accordance with each searching mode among the planes specified through the plane searching as a projection region. As the searching modes, there are, for example, an area priority mode and a speed priority mode.

More specifically, when the area priority mode is set, the control unit 108 decides a plane larger than other specified planes as a projection region. In addition, when the speed priority mode is set, the control unit 108 starts a plane searching process and subsequently decides a first specified plane as a projection region. Also, to decide the projection region, another condition may be further added. For example, in a process of the speed priority mode, a condition that the size of a specified plane be a predetermined size, for example, equal to or greater than the size of a projection screen, may be added.

In addition, the control unit 108 performs image projection control. Specifically, the control unit 108 causes the projection unit 112 to project an image stored in the storage unit 110 on the basis of a user manipulation detected by the manipulation detection unit 102. For example, when a manipulation of changing a projected image is detected by the manipulation detection unit 102, the control unit 108 acquires an image of a change destination indicated by the manipulation from the storage unit 110 or the like and causes the projection unit 112 to project the acquired image. Also, an image to be projected may be acquired from an external apparatus through communication or may be an image obtained through imaging of an imaging unit separately included in the information processing apparatus 100-1.

The storage unit 110 stores information regarding a process of the information processing apparatus 100-1. Specifically, the storage unit 110 stores setting information regarding a process, an image for projection, or the like. For example, as the setting information regarding a process, the storage unit 110 stores a threshold of unevenness for specifying a plane, setting information regarding a searching mode, a decision condition of a projection region, and the like.

The projection unit 112 projects an image on the basis of an instruction of the control unit 108. Specifically, the projection unit 112 projects an image designated from the control unit 108 to a projection region decided by the control unit 108. The projection unit 112 is, for example, a projector that is able to change a projection direction, a projection range, and the like and adjusts a projection direction or the like so that an image is projected to a projection region instructed by the control unit 108.

<2-2. Process of Apparatus>

Figure 3:
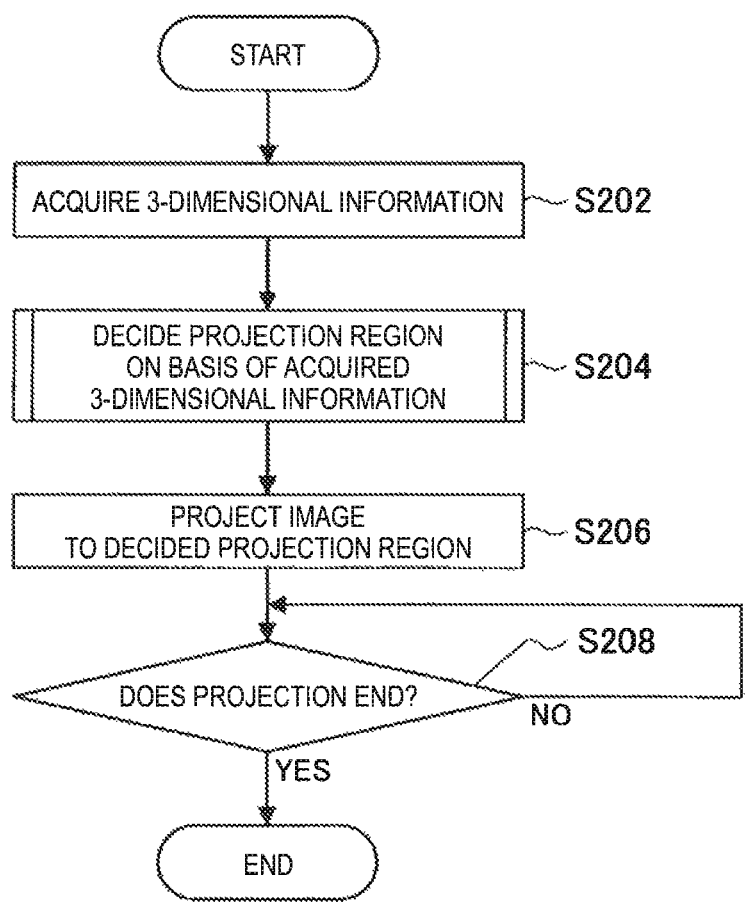
FIG. 3 is a flowchart conceptually illustrating an overview of a process of the information processing apparatus according to the embodiment.

Next, a process of the information processing apparatus 100-1 according to the embodiment will be described. First, an overview of the process of the information processing apparatus 100-1 will be described with reference to FIG. 3. FIG. 3 is a flowchart conceptually illustrating an overview of the process of the information processing apparatus 1001 according to the embodiment.

(Overview of Process)

First, the information processing apparatus 1001 acquires the 3-dimensional information (step S202). Specifically, the 3-dimensional information acquisition unit 104 acquires 3-dimensional information in the periphery of the information processing apparatus 100-1. Also, the 3-dimensional information may be periodically acquired and updated.

Next, the information processing apparatus 100-1 decides a projection region on the basis of the acquired 3-dimensional information (step S204). Specifically, when the 3-dimensional information acquisition unit 104 acquires the 3-dimensional information, the control unit 108 decides the projection region on the basis of the 3-dimensional information. The details will be described below.

Next, the information processing apparatus 100-1 projects an image to the decided projection region (step S206). Specifically, the control unit 108 acquires the projected image from the storage unit 110 and causes the projection unit 112 to project the acquired image to the decided projection region.

Next, the information processing apparatus 100-i determines whether the projection ends (step S208). Specifically, when the manipulation detection unit 102 detects a manipulation of ending the projection, the control unit 108 causes the projection unit 112 to end the projection of the image.

(Projection Region Decision Process)

Figure 4:
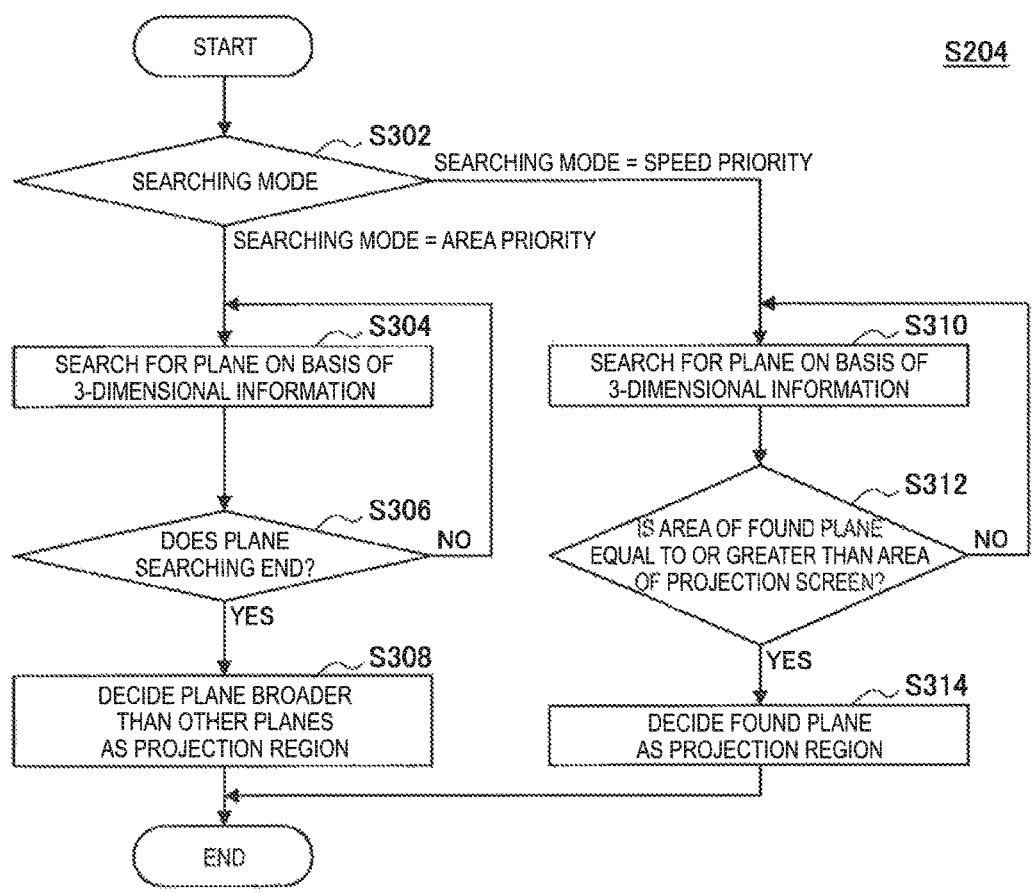
FIG. 4 is a flowchart conceptually illustrating a projection region decision process of the information processing apparatus according to the embodiment.

Next, a projection region decision process will be described in detail with reference to FIG. 4. FIG. 4 is a flowchart conceptually illustrating the projection region decision process of the information processing apparatus 100-1 according to the embodiment.

First, the information processing apparatus 100-1 determines a searching mode (step S302). Specifically, the control unit 108 determines which searching mode is set with reference to the setting information regarding the searching mode stored in the storage unit 110.

When the area priority mode is determined as the searching mode, the information processing apparatus 100-1 searches for a plane on the basis of the 3-dimensional information (step S304). Specifically, the plane searching unit 106 searches for a plane in the periphery of the information processing apparatus 100-1 on the basis of the 3-dimensional information.

Next, the information processing apparatus 100-1 determines whether the plane searching ends (step S306). Specifically, the plane searching unit 106 determines whether a plane is not additionally specified from the 3-dimensional information. Also, when the plane searching unit 106 determines that the plane is additionally specified, the plane searching unit 106 continues the plane searching.

When the plane searching is determined to end, the information processing apparatus 100-1 decides a broader plane than the other planes as a projection region (step S308). Specifically, when the plane searching ends, the control unit 108 decides the plane that is larger than any of the other planes among the specified planes as the projection region. For example, the control unit 108 can determine the size of the plane by an area, one direction, the length of an outer circumference, or the like.

In addition, when the speed priority mode is determined as the searching mode in step S302, the information processing apparatus 100-1 searches for a plane on the basis of the 3-dimensional information (step S310). Specifically, substantially the same process as step S304 is performed.

Subsequently, the information processing apparatus 100-1 determines whether the area of the found plane is equal to or greater than the area of a projection screen (step S312). Specifically, the plane searching unit 106 determines whether the size of the specified plane is equal to or greater than a screen size scheduled to be projected. Also, when the plane searching unit 106 determines that the size of the specified plane is less than the screen size scheduled to be projected, the plane searching unit 106 continues the plane searching.

When the plane searching unit 106 determines that the area of the found plane is equal to or greater than the area of the projection screen, the information processing apparatus 100-1 decides the found plane as the projection region (step S314). Specifically, the control unit 108 decides the plane which is specified by the plane searching unit 106 and has the area equal or greater than the projection screen as the projection region.

Also, when no plane satisfying the condition is found, the information processing apparatus 100-1 may decide a predetermined location as the projection region. For example, a first found plane, a plane larger than the other planes, or an initial projection direction or the like of the projection unit 112 can be decided as the projection region. In addition, in this case, the information processing apparatus 100-1 may notify a user of an error. For example, the information processing apparatus 100-1 projects an image indicating the error or outputs audio indicating the error.

In this way, according to the first embodiment of the present disclosure, the information processing apparatus 100-i acquires the 3-dimensional information indicating the disposition of the object and decides the projection region to which the image is projected in the space in which the object is disposed on the basis of the acquired 3-dimensional information. Therefore, by projecting the image while avoiding the object, it is possible to project the image to an appropriate projection destination while reducing the work of a user in projection of the image.

In addition, the information processing apparatus 100-1 decides the projection region from the plane specified on the basis of the 3-dimensional information. Therefore, by selecting the plane as the projection destination of the image, it is possible to ensure higher visibility than a plane with unevenness in regard to the projected image.

In addition, the information processing apparatus 100-1 decides the projection region on the basis of the size of the specified plane. Therefore, since a region with an area appropriate for the projection is easily decided as the projection destination, it is possible to suppress deterioration in the visibility such as cutoff of the projected image.

In addition, the information processing apparatus 100-1 decides a plane specified earlier than the other planes as the projection region. Therefore, by deciding the projection region earlier rather than when all the planes of candidates for the projection region are searched for, it is possible to shorten the time that the user waits for the projection.

<2-3. Modification Examples>

The first embodiment of the present disclosure has been described above. However, the embodiment is not limited to the above-described example. Hereinafter, first to third modification examples of the invention will be described.

(First Modification Example)

According to a first modification example of the embodiment, the information processing apparatus 100-1 may be a determination element that decides a position of a plane as a projection region. Specifically, the control unit 108 decides the projection region on the basis of the position of the plane specified by the plane searching unit 106.

For example, when the specified plane is positioned at a location appropriate for projection, such as a wall, a screen, or a table, the control unit 108 decides the plane as a projection region. Conversely, when the specified plane is positioned at a location inappropriate for projection of an image, such as a ceiling or a floor, the control unit 108 does not decide the plane as a projection region. Also, the position of the plane can be included in information associated with the plane at the time of the plane searching by the plane searching unit 106. In addition, appropriateness of the projection to the position of the plane may be set in advance or may be changed through a user manipulation.

Also, when the specified plane is not decided as the projection region, the plane searching unit 106 performs the plane searching again. In this case, the plane not decided as the projection region is considered as a plane excluded from targets of the plane searching process.

In this way, according to the first modification example of the embodiment, the information processing apparatus 100-1 decides a projection region on the basis of the position of the specified plane. Therefore, by excluding the plane at a position inappropriate for projection from the candidates for the projection region, an image can easily be projected to a position at which the user can be expected to easily view the image, and thus it is possible to improve satisfaction of the user.

(Second Modification Example)

According to a second modification example of the embodiment, the information processing apparatus 100-1 may be a determination element that decides a form appearing on a plane as a projection region. Specifically, the control unit 108 decides a projection region on the basis of the form appearing on the plane specified by the plane searching unit 106.

For example, the information processing apparatus 100-1 separately includes an imaging unit. When a plane is specified by the plane searching unit 106, the control unit 108 causes the imaging unit to perform imaging so that the specified plane is a subject. Then, on the basis of an image obtainable through the imaging by the imaging unit, the control unit 108 determines whether a form of the specified plane, for example, presence or absence of text, illustration, a pattern, or the like, texture such as gloss or quality, color, or material quality, is appropriate for projection. When the control unit 108 determines that the form of the specified plane is appropriate for projection, the control unit 108 decides the specified plane as a projection region. Conversely, when the control unit 108 determines that the form of the specified plane is not appropriate for projection, the control unit 108 does not decide the specified plane as a projection region. Also, the appropriateness of the projection of the plane may be stored in advance in the storage unit 110 or may be changed through a user manipulation. In addition, the control unit 108 may decide the projection region by further adding a property or the like of an image to be projected.

In this way, according to the second modification example of the embodiment, the information processing apparatus 100-1 decides a projection region on the basis of the form appearing on the specified plane. Therefore, by excluding the plane of the form inappropriate for projection from the candidates for the projection region, it is possible to suppress the deterioration in visibility of an image to be projected.

(Third Modification Example)

According to a third modification example of the embodiment, the information processing apparatus 100-1 may project an image toward the information processing apparatus 100-1. Specifically, the information processing apparatus 100-1 separately includes an image projection region. The control unit 108 adds the image projection region to candidates for the projection region.

For example, the control unit 108 selects a plane which is a projection region from a plane specified by the plane searching unit 106 and the image projection region included in the information processing apparatus 100-1, for example, a plane or the like inclined toward the inside of the apparatus. In addition, the projection unit 112 can set a direction oriented toward the information processing apparatus 100-1 as a projection direction and project an image toward the image projection region of the information processing apparatus 100-1 in accordance with an instruction of the control unit 108. Therefore, when the image projection region is decided as a projection region, the control unit 108 causes the projection unit 112 to project the image to the image projection region.

In this way, according to the third modification example of the embodiment, the information processing apparatus 100-1 further includes the image projection region and adds the image projection region to candidates for the projection region. Therefore, by increasing alternatives of the projection region, it is possible to reduce a possibility of a plane not being found and an image being difficult to project.

Also, when a plane which is a candidate for the projection region is not specified by the plane searching unit 106, the control unit 108 may decide the projection region as the image projection region. In this case, even when there is no plane to which an image is projected to the periphery of the information processing apparatus 100-1, the image can be projected, and thus cases in which the information processing apparatus 100-1 is usable can be increased and convenience can be improved.

<3. Second Embodiment (Example in Which Projection Region is Decided on Basis of User Information)>

The information processing apparatus 100-1 according to the first embodiment of the present disclosure has been described above. Next, an information processing apparatus 100-2 according to a second embodiment of the present disclosure will be described. The information processing apparatus 100-2 decides a projection region from a specified plane on the basis of user information.

<3-1. Configuration of Apparatus>

Figure 5:
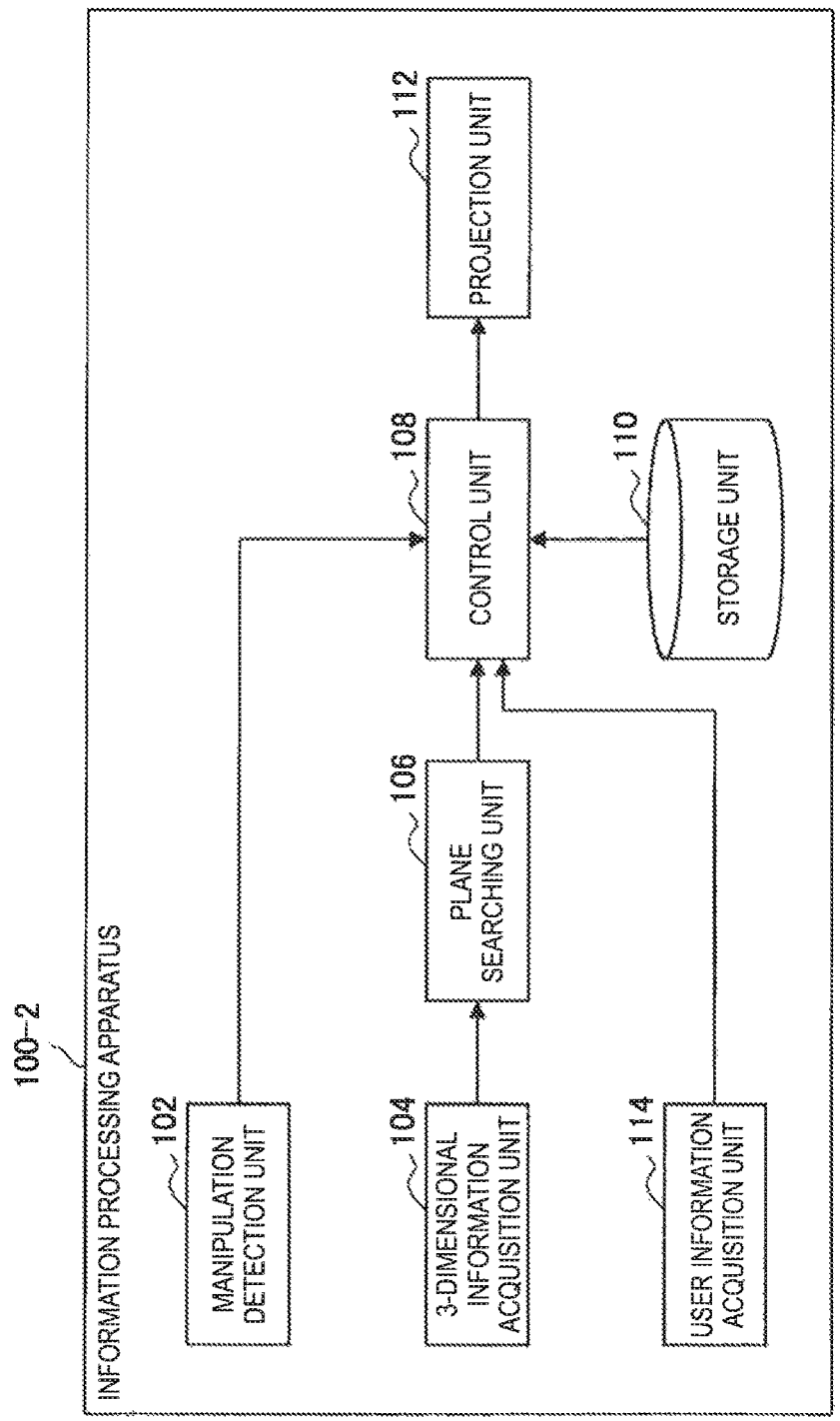
FIG. 5 is a block diagram illustrating a schematic functional configuration of an information processing apparatus according to a second embodiment of the present disclosure.

First, a functional configuration of the information processing apparatus 100-2 according to the second embodiment of the present disclosure will be described with reference to FIG. 5. FIG. 5 is a block diagram illustrating a schematic functional configuration of the information processing apparatus 100-2 according to the embodiment. Also, description of substantially the same configuration as the configuration of the first embodiment will be omitted.

As illustrated in FIG. 5, the information processing apparatus 100-2 includes a user information acquisition unit 114 in addition to the manipulation detection unit 102, the 3-dimensional information acquisition unit 104, the plane searching unit 106, the control unit 108, the storage unit 110, and the projection unit 112.

The user information acquisition unit 114 acquires information regarding a user in the periphery of the information processing apparatus 100-2 (hereinafter also referred to as user information). Specifically, the user information includes information indicating the position of the user (hereinafter also referred to as user position information). The user information acquisition unit 114 acquires the user position information. For example, the user information acquisition unit 114 acquires the user position information regarding the user in the periphery of the information processing apparatus 100-2 by analyzing an image obtained through imaging of an imaging unit separately included in the information processing apparatus 100-2. Also, the user information acquisition unit 114 may acquire the user position information from an external apparatus through communication or may generate the user position information from 3-dimensional information.

Figure 6:
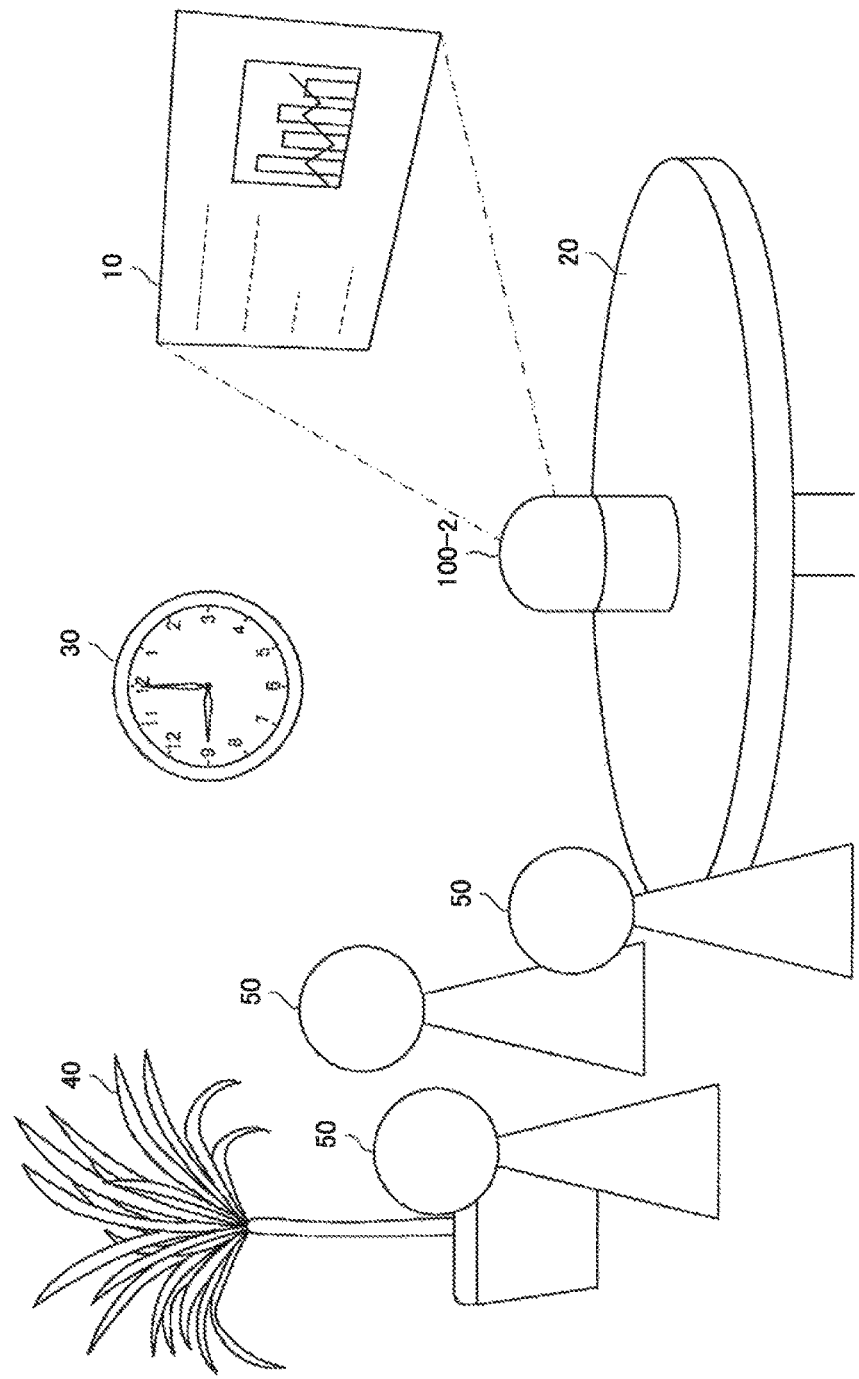
FIG. 6 is a diagram illustrating a projection region decision process in the information processing apparatus according to the embodiment.

The control unit 108 decides a projection region from a plane specified by the plane searching unit 106 on the basis of the user information. Specifically, the control unit 108 decides a projection region on the basis of a relation between the position of the user indicated by the user position information acquired by the user information acquisition unit 114 and the position of the plane specified by the plane searching unit 106. Further, a projection region decision process based on a positional relation between the user and the plane will be described in detail with reference to FIG. 6. FIG. 6 is a diagram illustrating the projection region decision process in the information processing apparatus 100-2 according to the embodiment.

First, the control unit 108 determines the positional relation between the user and the plane on the basis of the position of the user indicated by the user position information acquired by the user information acquisition unit 114 and the position of the plane specified by the plane searching unit 106. For example, the control unit 108 determines whether the position of the plane is within a predetermined range from the positions of users 50 illustrated in FIG. 6. Also, the control unit 108 may determine whether a distance between the position of the user and the position of a specified plane is equal to or greater than a predetermined length. In addition, when there are a plurality of users, the position of one user among the plurality of users may be used or one position specified from a plurality of pieces of user position information, for example, a central position of a user group, may be used. In addition, information used to determine the positional relation may be stored in the storage unit 110 or may be acquired through communication.

When the control unit 108 determines that the positional relation is a predetermined relation, the control unit 108 decides the specified plane as a projection region and causes the projection unit 112 to project an image to the decided projection region. For example, when the control unit 108 determines that the position of the specified plane is within a predetermined range from the position of the user 50, the control unit 108 decides the plane as a projection region. Then, the control unit 108 causes the projection unit 112 to project an image 10 to the plane.

Also, although the example in which the control unit 108 determines that the position of the specified plane is within the predetermined range from the position of the user has been described above, the control unit 108 may determine another positional relation. Specifically, the control unit 108 may determine whether a position indicated by the user position information is on a straight line touching a surface of the plane or is in the periphery of the straight line. For example, when the user is located on the straight line or the like, visibility of an image to be projected to the plane deteriorates. Therefore, the control unit 108 does not decide the plane as a projection region.

<3-2. Process of Apparatus>

Figure 7:
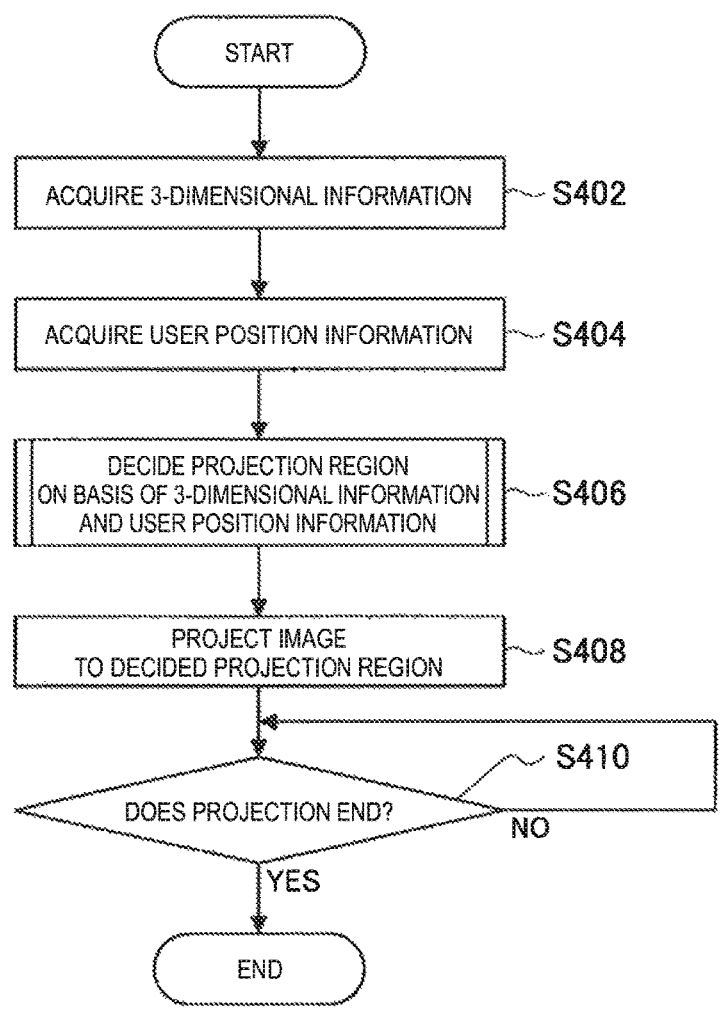
FIG. 7 is a flowchart conceptually illustrating an overview of a process of the information processing apparatus according to the embodiment.

Next, a process of the information processing apparatus 100-2 according to the second embodiment of the present disclosure will be described. First, an overview of the process of the information processing apparatus 100-2 will be described with reference to FIG. 7. FIG. 7 is a flowchart conceptually illustrating an overview of a process of the information processing apparatus 100-2 according to the embodiment. Also, description of substantially the same process as the process of the first embodiment will be omitted.

(Overview of Process)

First, the information processing apparatus 100-2 acquires the 3-dimensional information (step S402) and acquires the user position information (step S404). Specifically, the user information acquisition unit 114 acquires the user position information indicating the position of a user located in the periphery of the information processing apparatus 100-1. Also, the user position information may be acquired and updated periodically.

Next, the information processing apparatus 100-2 decides a projection region on the basis of the acquired 3-dimensional information and user position information (step S406). Specifically, when the 3-dimensional information and the user position information are acquired, the control unit 108 decides the projection region on the basis of the 3-dimensional information and the user position information. The details will be described below.

Next, the information processing apparatus 100-2 projects an image to the decided projection region (step S408) and determines whether the projection ends (step S410).

(Projection Region Decision Process)

Figure 8:
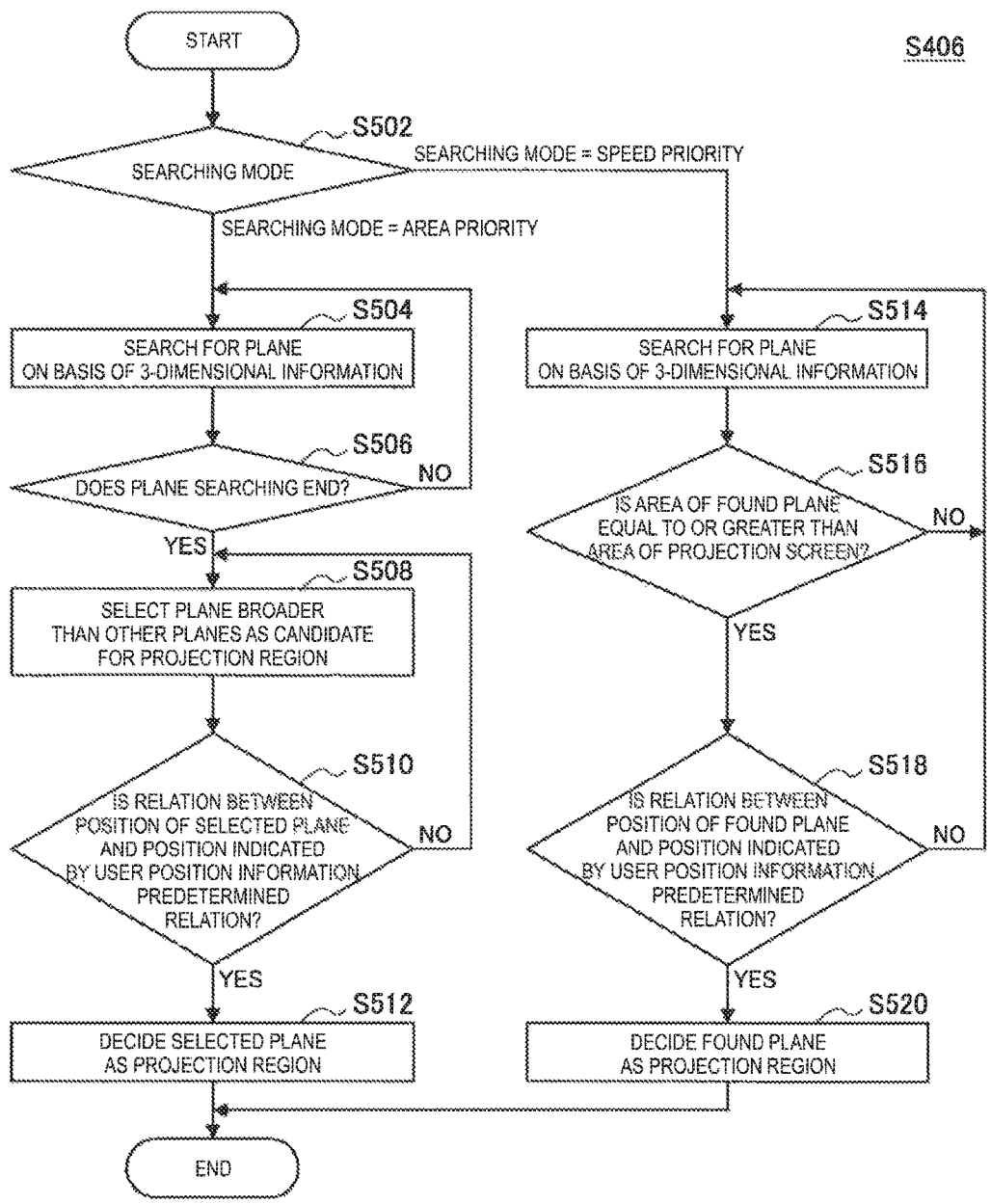
FIG. 8 is a flowchart conceptually illustrating a projection region decision process of the information processing apparatus according to the embodiment.

Next, a projection region decision process will be described in detail with reference to FIG. 8. FIG. 8 is a flowchart conceptually illustrating the projection region decision process of the information processing apparatus 100-2 according to the embodiment.

First, the information processing apparatus 100-2 determines the searching mode (step S502). When the searching mode is determined to be the area priority mode, a plane is searched for on the basis of the 3-dimensional information (step S504).

Next, the information processing apparatus 100-2 determines whether the plane searching ends (step S506). When the plane searching is determined to end, a plane broader than the other planes is selected as a candidate for the projection region (step S508).

Next, the information processing apparatus 100-2 determines whether the relation between the position of the selected plane and the position indicated by the user position information is the predetermined relation (step S510). Specifically, the control unit 108 determines whether the position of the plane selected from the specified planes is within the predetermined range from the position indicated by the user position information.

When it is determined that the relation between the position of the selected plane and the position indicated by the user position information is the predetermined relation, the information processing apparatus 100-2 decides the selected plane as the projection region (step S512). Specifically, when it is determined that the position of the selected plane is within the predetermined range from the position indicated by the user position information, the control unit 108 decides the selected plane as the projection region. Conversely, when it is determined that the relation between the position of the selected plane and the position indicated by the user position information is not the predetermined relation, the process returns to step S508 and another plane is selected as the projection region.

In addition, when the searching mode is determined to be the speed priority mode in step S502, the information processing apparatus 100-2 searches for a plane on the basis of the 3-dimensional information (step S514) and determines whether the area of the found plane is equal to or greater than the area of the projection screen (step S516).

When it is determined that the area of the found plane is equal to or greater than the area of the projection screen, the information processing apparatus 100-2 determines whether the relation between the position of the found plane and the position indicated by the user position information is the predetermined relation (step S518). Specifically, when the plane is specified by the plane searching unit 106, substantially the same process as the process of step S510 is performed on the plane.

When it is determined that the relation between the position of the found plane and the position indicated by the user position information is the predetermined relation, the information processing apparatus 100-2 decides the found plane as the projection region (step S520). Specifically, when it is determined in step S518 that the position of the specified plane is within the predetermined range from the position indicated by the user position information, the control unit 108 decides the specified plane as the projection region. Conversely, when it is determined that the relation between the position of the specified plane and the position indicated by the user position information is not the predetermined relation, the process returns to step S514 and the plane searching resumes.

In this way; according to the second embodiment of the present disclosure, the information processing apparatus 100-2 decides the projection region from the specified planes on the basis of the information regarding the users in the periphery of the information processing apparatus 100-2. Therefore, by deciding the projection region on the basis of a user viewing a projected image, the image is projected to a position at which visibility for the user can be easily ensured, and thus it is possible to improve satisfaction of the user.

In addition, the user information includes the user position information indicating the position of the user and the information processing apparatus 100-2 decides the projection region on the basis of the relation between the position of the user indicated by the user position information and the position of the specified plane. Therefore, by projecting an image to the plane in accordance with the position of the user, the user can view a projected image without moving, and thus it is possible to improve convenience.

<3-3. Modification Examples>

The second embodiment of the present disclosure has been described above. Also, the embodiment is not limited to the above-described example. Hereinafter, first to fourth modification examples of the embodiment will be described.

(First Modification Example)

According to a first modification example of the embodiment, the information processing apparatus 100-2 may decide a projection region on the basis of information that changes in accordance with the number of users. Specifically; the control unit 108 decides a projection region on the basis of the information that changes in accordance with the number of users (hereinafter also referred to as number-of-users information) in the periphery of the information processing apparatus 100-2.

More specifically, the number-of-users information indicates the number of users. The control unit 108 decides a projection region from a specified plane on the basis of the number of users indicated by the number-of-users information acquired by the user information acquisition unit 114. For example, the control unit 108 determines whether the number of users indicated by the number-of-users information is equal to or greater than a threshold. When the number of users is determined to be equal to or greater than the threshold, a plane belonging to a predetermined region, for example, a plane located on a ceiling, is decided as a projection region. Conversely, when user information indicated by the number-of-users information is determined to be less than the threshold, the control unit 108 may perform the projection region decision process in the first and second embodiments.

Also, the number-of-users information may be density of the users. The control unit 108 may decide a projection region from a specified plane on the basis of the density of the users indicated by the number-of-users information. In addition, a combination of the number-of-users information and the user position information may be used to decide a projection region. For example, the control unit 108 may decide a plane belonging to a region in which the density of the users is lower than in other regions as a projection region.

In this way, according to the first modification example of the embodiment, the above-described user information includes the number-of-users information that changes in accordance with the number of users in the periphery of the information processing apparatus 100-2. The information processing apparatus 100-2 decides a projection region on the basis of the number-of-users information. Therefore, by deciding the projection region using abstracted information regarding the users, it is possible to reduce a processing load in the projection region decision and shorten a time taken in the process.

(Second Modification Example)

According to a second modification example of the embodiment, the information processing apparatus 100-2 may decide a plane corresponding to a visual line of a user as a projection region. Specifically, the control unit 108 decides a projection region on the basis of a visual line of a user estimated using information that changes in accordance with the visual line of the user (hereinafter referred to as user visual line information) and the position of a specified plane.

For example, the user visual line information is information indicating an attitude of the head of a user, a direction of the face, a position of the pupils or irises, or a visual field, a visual range, or the like of the user. The control unit 108 estimates a visual line of the user from the user visual line information acquired by the user information acquisition unit 114. Then, the control unit 108 determines whether the specified visual line of the user is oriented toward the specified plane. When the visual line of the user is determined to be oriented toward the specified plane, the control unit 108 decides the specified plane as a projection region. Also, the visual line of the user may be specified by an external apparatus and information indicating the specified visual line of the user may be acquired through communication. In addition, when the user visual line information is information indicating a visual field or a visual range of the user, the control unit 108 may determine whether the specified plane is included in the visual field or the visual range of the user.

Also, when there are a plurality of users, the control unit 108 may decide a plane on which visual lines of more of the plurality of users are focused than other planes as a projection range.

In this way, according to the second modification example of the embodiment, the above-described user information includes the user visual line information that changes in accordance with the visual line of the user. The information processing apparatus 100-2 decides the projection region on the basis of the visual line user the user estimated using the user visual line information and the position of the specified plane. In general, a user views a plane on which she or he assumes an image will be projected while waiting for projection of a projector or the like. Therefore, since it is easy for an image to be projected in a viewing direction of the user, the image is projected to a position expected by the user. Thus, it is possible to suppress occurrence of discomfort of the user.

(Third Modification Example)

Figure 9:
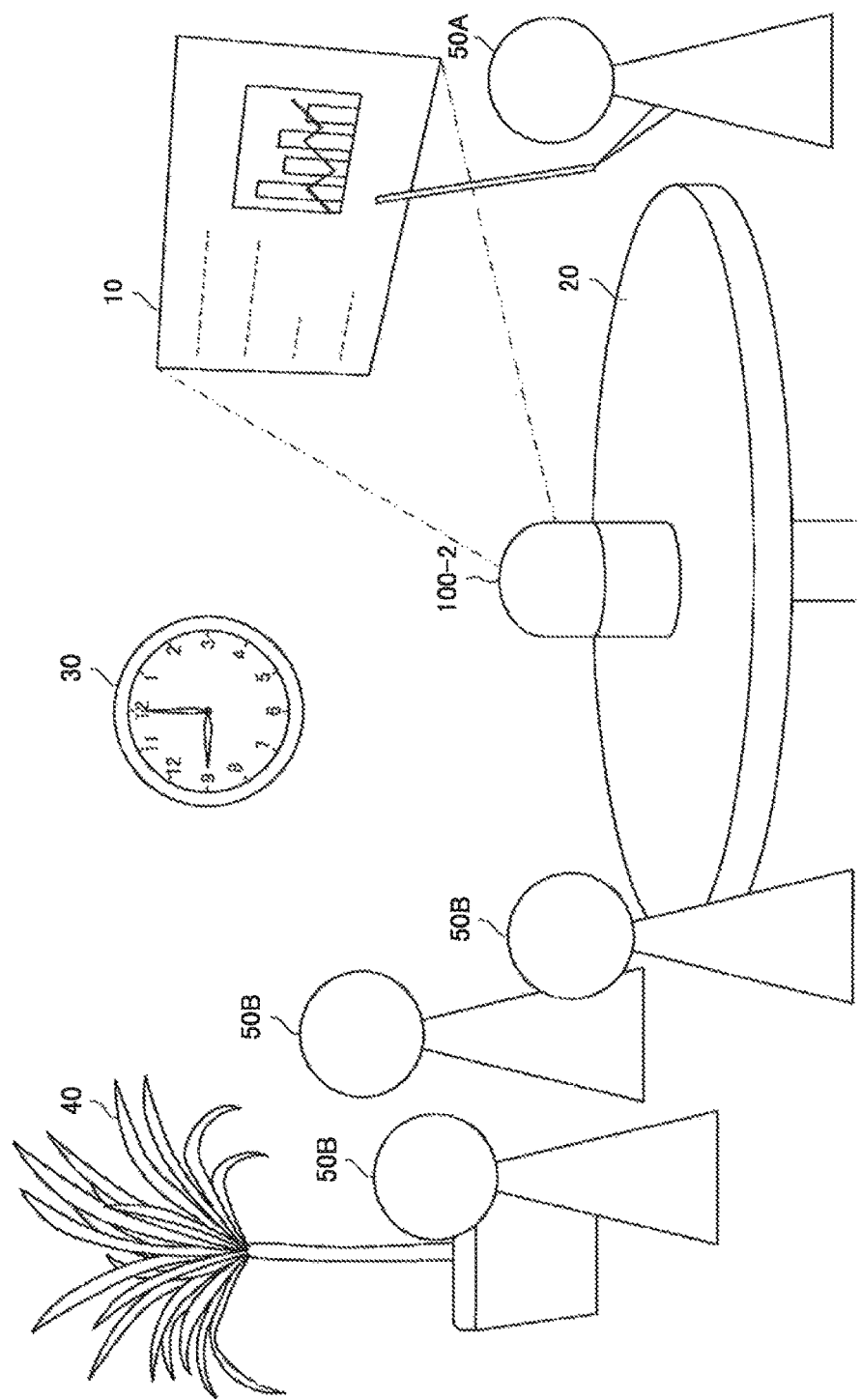
FIG. 9 is a diagram illustrating an example of projection region decision based on user attribute information in an information processing apparatus according to a third modification example of the embodiment.
Figure 10:
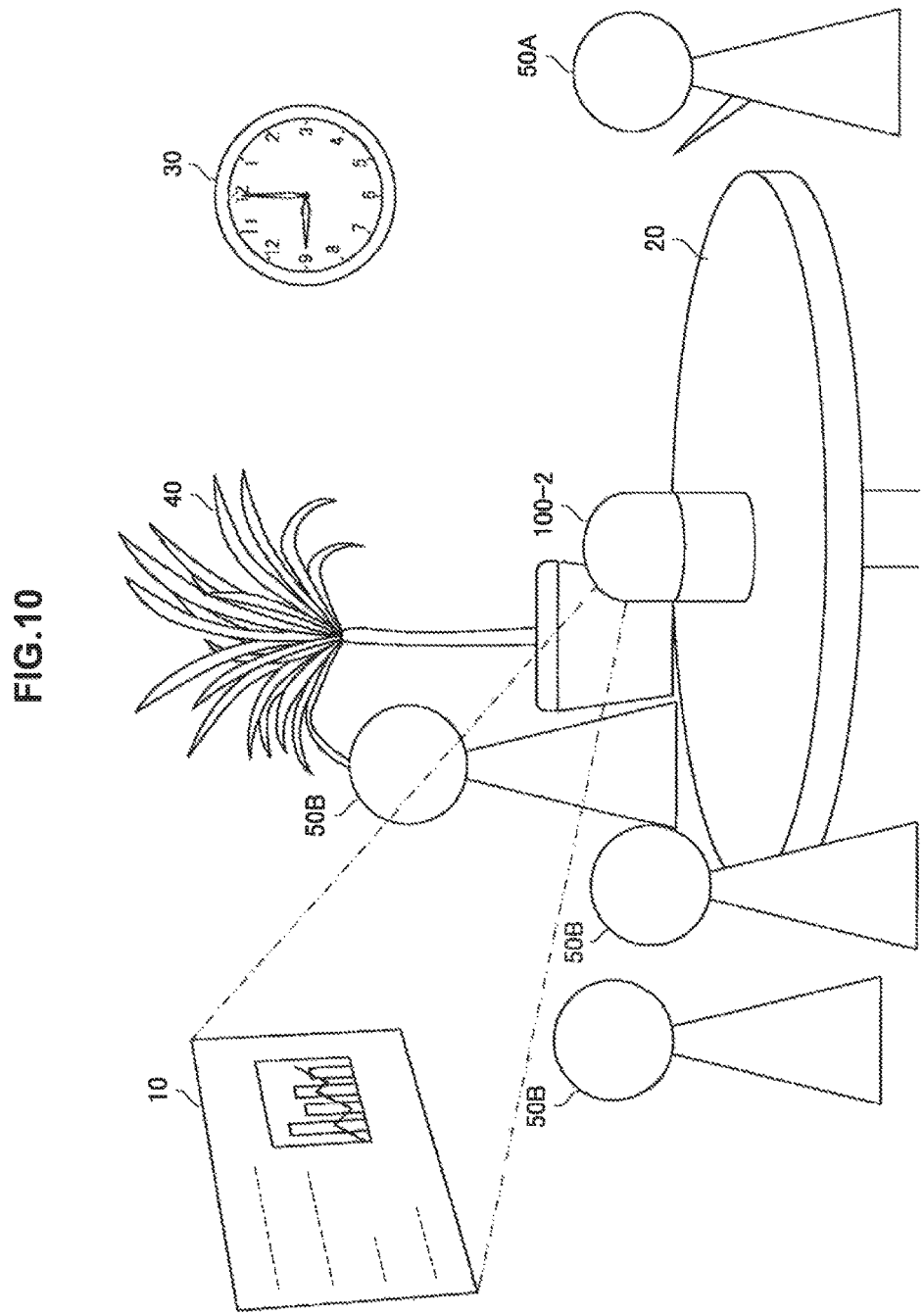
FIG. 10 is a diagram illustrating another example of projection region decision based on user attribute information in the information processing apparatus according to the third modification example of the embodiment.

According to a third modification example of the embodiment, the information processing apparatus 100-2 may further determine a user and decide a projection region in accordance with the determined user. Specifically, the information processing apparatus 100-2 further includes a user identification unit that identifies a user. The control unit 108 decides a projection region on the basis of attribute information regarding the user identified by the user identification unit. More specifically, the control unit 108 selects user information which is used to decide a projection region on the basis of the attribute information regarding the user and decides a projection region on the basis of the selected user information. Further, a process in the modification example will be described in detail with reference to FIGS. 9 and 10. FIG. 9 is a diagram illustrating an example of projection region decision based on user attribute information in the information processing apparatus 100-2 according to the third modification example of the embodiment. FIG. 10 is a diagram illustrating another example of projection region decision based on user attribute information in the information processing apparatus 100-2 according to the third modification example of the embodiment.

First, the user identification unit identifies users in the periphery of the information processing apparatus 100-2. For example, the user identification unit acquires an image in which the faces of the users in the periphery of the information processing apparatus 100-2 are depicted and identifies, for example, users 50A and 50B illustrated in FIG. 9 Using a face recognition process or the like. Also, an image in which the faces of the users are depicted may be acquired from an external apparatus. In addition, the user identification unit may identify the users on the basis of voices of the users or may identify the users on the basis of identification information superimposed on radio waves received from communication tags which the users have.

Next, the control unit 108 acquires the attribute information regarding the identified users. Specifically, the attribute information regarding the user includes information indicating whether a user is a manipulation user, and is stored in the storage unit 110 or is acquired from an external apparatus through communication. For example, the control unit 108 acquires the attribute information regarding the user 50A illustrated in FIG. 9 from the storage unit 110.

Next, when the acquired attribute information indicates the manipulation user, the control unit 108 decides a projection region on the basis of the user information regarding the manipulation user. For example, the control unit 108 determines whether the attribute information regarding the user 50A illustrated in FIG. 9 indicates the manipulation user. When the attribute information regarding the user 50A indicates the manipulation user, the control unit 108 decides a plane closer to the user 50A than the other planes as a projection region from the planes specified by the plane searching unit 106 on the basis of the user information regarding the user 50A, for example, the user position information. Then, as illustrated in FIG. 9, the control unit 108 causes the projection unit 112 to display the image 10 in the decided projection region.

In addition, when the attribute information regarding the user includes information indicating whether the user is a viewing user and the acquired attribute information indicates that the user is a viewing user, the control unit 108 may decide the projection region on the basis of the user information regarding the viewing user. For example, the control unit 108 determines whether the attribute information regarding the users 50B illustrated in FIG. 10 indicates viewing users. When the attribute information regarding the users 50B is determined to indicate viewing users, the control unit 108 decides a plane closer to the users 50B than the other planes from the planes specified by the plane searching unit 106 as a projection region on the basis of the user position information regarding the users 50B. Then, as illustrated in FIG. 10, the control unit 108 causes the projection unit 112 to display the image 10 in the decided projection region. Also, when there are a plurality of users having the attribute information which satisfies conditions, one user may be selected at random from the plurality of users or the users may be narrowed down under still other conditions.

In addition, the attribute information regarding the user may be information indicating an age, sex, a race, or a job of the user. The control unit 108 may select a user serving as a reference of the projection region decision process on the basis of content indicated by the information.

In this way, according to the third modification example of the embodiment, the information processing apparatus 100-2 further includes the user identification unit that identifies a user. The projection region is decided on the basis of the attribute information regarding the user identified by the user identification unit. Therefore, by performing the projection control of the image using the identified user having specific attributes as a reference, projection suitable for a scene corresponding to the attributes is automatically performed. Thus, it is possible to improve convenience.

In addition, the attribute information includes information indicating whether the user is the manipulation user. When the attribute information indicates the manipulation user, the information processing apparatus 100-2 decides the projection region on the basis of the user information regarding the manipulation user. Therefore, by performing the projection control on the basis of the user manipulating the information processing apparatus 100-2, the projection in line with the intention of the manipulation user can be performed and it is possible to give the user an impression of user-friendliness. Also, even when the attribute information indicates the viewing user, the same advantageous effect can be expected.

(Fourth Modification Example)

According to a fourth modification example of the embodiment, the information processing apparatus 100-2 may perform correction so that a projected image is easy for the user to view. Specifically; the control unit 108 performs correction on an image to be projected on the basis of the position of the projection region. Further, the control unit 108 performs correction for the user on the image to be projected on the basis of the position of the projection region, the position of the user, and the position of the information processing apparatus 100-2. A process in the modification example will be described in detail with reference to FIG. 11. FIG. 11 is a diagram illustrating an example of a projected image correction process in the information processing apparatus 100-2 according to the fourth modification example of the embodiment.

First, when the projection region is decided, the control unit 108 causes the projection unit 112 to project an image to the projection region. For example, the control unit 108 decides an upper surface of a table 20 illustrated in the left drawing of FIG. 11 as a projection region and causes the projection unit 112 to project the image 10 to the upper surface of the table 20.

Here, a projection apparatus such as a projector is generally designed to perform projection using a predetermined direction such as a front direction as a reference. Thus, when an image is projected in a direction other than the predetermined direction, the projected image is distorted in some cases. For example, when the control unit 108 is designed to cause the projection unit 112 to perform projection using the front of the information processing apparatus 100-2 as a reference and the image 10 is projected to the table 20 illustrated in the left drawing of FIG. 11, the projected image 10 can be distorted in a trapezoidal shape spread in a projection direction.

Accordingly, when the position of the projection region is located at a position at which the image can be distorted, the control unit 108 performs correction on an image to be projected. For example, when the projection region is located in a direction different from a projection reference direction, the control unit 108 performs trapezoid correction on an image to be projected, as illustrated in the right drawing of FIG. 11.

In addition, depending on the position of the user viewing the projected image and the position of the information processing apparatus 100-2, it is difficult for the user to view the image projected to the projection region in some cases. For example, when the image 10 is projected between the users 50 and the information processing apparatus 100-2, as illustrated in FIG. 11, the image 10 can be projected to be reversed up and down with respect to the users 50 and it can be difficult for the user 50 to view the image 10.

Accordingly, the control unit 108 performs correction for the user on the image to be projected on the basis of the position of the projection region, the position of the user, and the position of the information processing apparatus 100-2. For example, when the projection region is decided between the users 50 and the information processing apparatus 100-2, the control unit 108 rotates the image 10 projected to the projection region so that the image 10 faces the users 50. As a result, the image 10 is projected to face the users 50, as illustrated in the right drawing of FIG. 11.

Also, although the example in which the trapezoid correction or the rotation correction is performed on the projected image has been described above, the control unit 108 may perform other image expansion or contraction or a correction process for color, brightness, or the like in accordance with a position or a form of the projection region.

In this way, according to the fourth modification example of the embodiment, the information processing apparatus 100-2 performs correction on an image to be projected on the basis of the position of the decided projection region. Therefore, since the image to be projected is fitted in the decided projection region, it is possible to improve the visibility of the projected image.

In addition, the information processing apparatus 100-2 performs the correction for the user on the image to be projected on the basis of the position of the projection region, the position of the user, and the position of the information processing apparatus 100-2. Therefore, by correcting the projected image on the basis of the user, it is possible to further improve the visibility of the projected image.

<4. Third Embodiment (Example in Which Projection Form is Changed)>

The information processing apparatus 100-2 according to the second embodiment of the present disclosure has been described above. Next, an information processing apparatus 100-3 according to a third embodiment of the present disclosure will be described. The information processing apparatus 100-3 changes a projection form of an image on the basis of a change in 3-dimensional information regarding a projection region.

<4-1. Configuration of Apparatus>

A functional configuration of the information processing apparatus 100-3 according to the third embodiment of the present disclosure is substantially the same as the configurations according to the first and second embodiments except for the function of the control unit 108. Therefore, only the function of the control unit 108 will be described.

Figure 13:
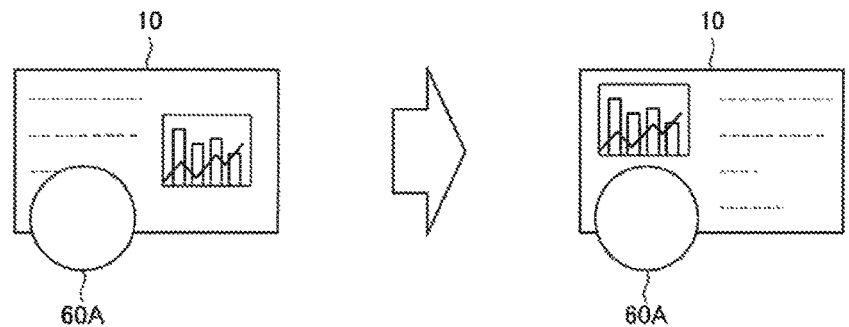
FIG. 13 is a diagram illustrating a change example of the projection form in the information processing apparatus according to the embodiment.
Figure 14:
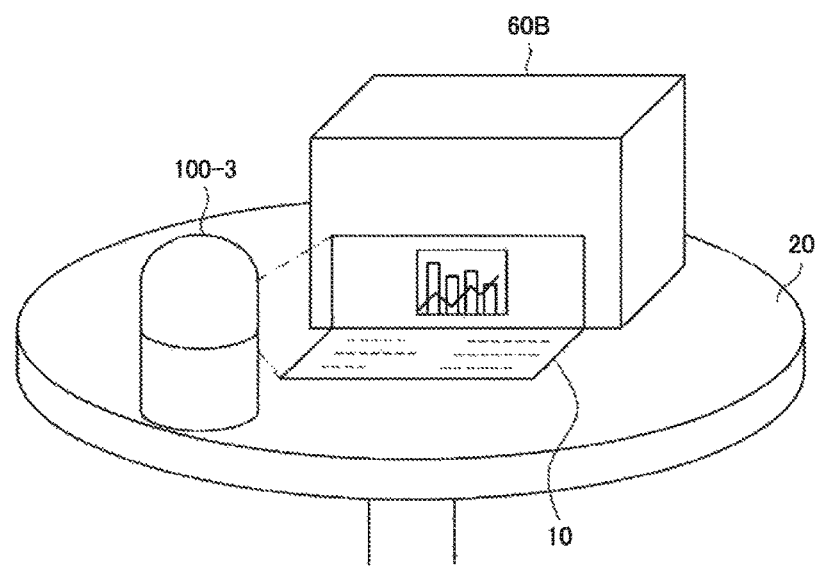
FIG. 14 is a diagram illustrating a change example of the projection form in the information processing apparatus according to the embodiment.

The control unit 108 changes a projection form of an image on the basis of a change in the form of the decided projection region, for example, a change in 3-dimensional information indicating unevenness or the like. Specifically, the control unit 108 determines whether unevenness is included in a decided projection region on the basis of the changed 3-dimensional information. When it is determined that there is unevenness in the decided projection region, the projection form is changed. Further, a projection form changing process will be described in detail with reference to FIGS. 12 to 14. FIGS. 12 to 14 are diagrams illustrating a change example of a projection form in the information processing apparatus 100-3 according to the third embodiment of the present disclosure.

First, when the 3-dimensional information acquired by the 3-dimensional information acquisition unit 104 is changed, the control unit 108 determines whether unevenness is included in the projection region on the basis of the 3-dimensional information. For example, as illustrated in the left drawings of FIGS. 12 and 13, when an obstacle 60A is placed in the way of the projection of the image 10, the 3-dimensional information regarding the projection region is changed. Therefore, the control unit 108 determines whether unevenness is included in the projection region on the basis of the changed 3-dimensional information. Also, the unevenness can be a predetermined height or depth using the height or the depth of the planar projection region as a reference.

When the control unit 108 determines that unevenness is included in the projection region, the control unit 108 changes the projection form in accordance with a change mode. Specifically, when the control unit 108 determines that the unevenness is included in the projection region, the control unit 108 performs a projection form changing process in accordance with the change mode with reference to the set change mode. Also, as the change mode, there are modes such as a region change mode, a content change mode, a shape use mode, and the like. The change mode can be stored in the storage unit 110.

For example, when the change mode is the region change mode, the control unit 108 changes the projection region to a region in which no unevenness is included. More specifically, when the control unit 108 determines that the unevenness is included in the projection region, the control unit 108 causes the plane searching unit 106 to search for a plane in which no unevenness is included. Then, the control unit 108 decides a plane specified by the plane searching unit 106 as a new projection region and causes the projection unit 112 to project the projection image to the new projection region. As a result, as illustrated in the right drawing of FIG. 12, the projected image 10 is moved to avoid the obstacle 60A.

In addition, when the change mode is the content change mode, the control unit 108 serves as a display control unit and changes the image to be projected in conformity with the unevenness. For example, the control unit 108 changes the image to be projected in conformity with the position of the unevenness. More specifically, the control unit 108 changes a layout of the image so that content of the image is not projected to the position of the unevenness included in the projection region, that is, the position of the unevenness becomes a margin. As a result, as illustrated in the right drawing of FIG. 13, the layout of the image is changed so that content of the image 10 to be projected is not projected to a position at which the obstacle 60A is placed.

In addition, when the change mode is the shape use mode, the control unit 108 changes the image to be projected in conformity with the shape of unevenness. More specifically, the control unit 108 first specifies the shape of the unevenness included in the projection region. Then, the control unit 108 edits the layout or the like of an image in conformity with the unevenness of a specified shape. As a result, as illustrated in FIG. 14, the layout of the image 10 can be changed so that content of the image 10 to be projected is divided into a part to be projected to the obstacle 60B and a part to be projected to the table 20.

Also, even when unevenness is determined to be included in the projection region, the projection region may not be changed. For example, when the change mode is the current state maintaining mode, the control unit 108 does not perform a process and the projection region is not changed even when unevenness is included in the projection region. In addition, when the change mode is the current state maintaining mode, the control unit 108 may not determine whether unevenness is included in the projection region.

<4-2. Process of Apparatus>

Figure 15:
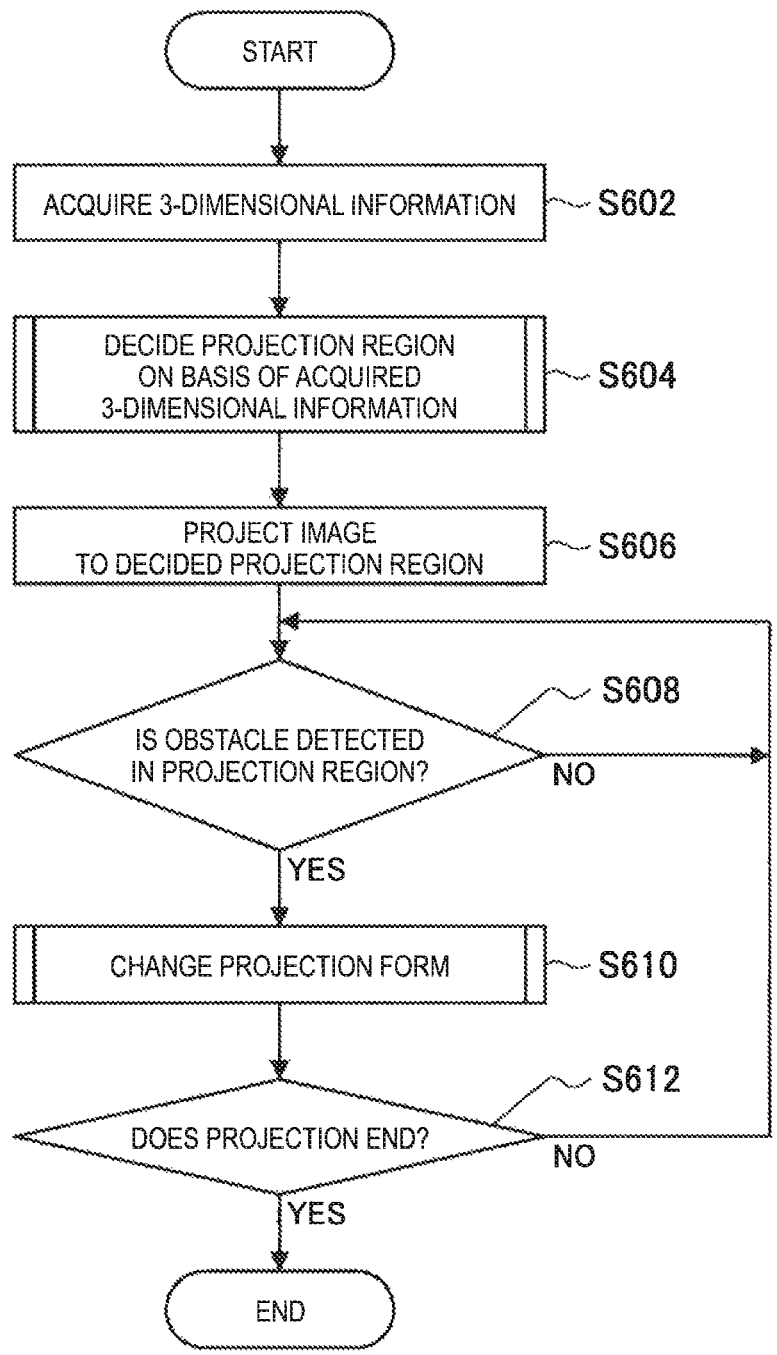
FIG. 15 is a flowchart conceptually illustrating an overview of a process of the information processing apparatus according to the embodiment.

Next, a process of the information processing apparatus 100-3 according to the third embodiment of the present disclosure will be described. First, an overview of the process of the information processing apparatus 100-3 will be described with reference to FIG. 15. FIG. 15 is a flowchart conceptually illustrating an overview of the process of the information processing apparatus 100-3 according to the embodiment. Also, description of substantially the same process as the process in the first and second embodiments will be omitted.

First, the information processing apparatus 100-3 acquires the 3-dimensional information (step S602) and decides a projection region on the basis of the acquired 3-dimensional information (step S604). Next, the information processing apparatus 100-3 projects an image to the decided projection region (step S606).

Next, the information processing apparatus 100-3 determines whether an obstacle is detected in the projection region (step S608). Specifically, the 3-dimensional information acquisition unit 104 periodically acquires the 3-dimensional information and the control unit 108 determines whether unevenness is included in the projection region on the basis of the acquired 3-dimensional information.

When the obstacle is determined to be detected, the information processing apparatus 100-3 changes the projection form (step S610) and determines whether the projection ends (step S612). Specifically, when the unevenness is determined to be included in the projection region, the control unit 108 changes the projection form of the image. The details will be described below.

(Projection Form Changing Process)

Figure 16:
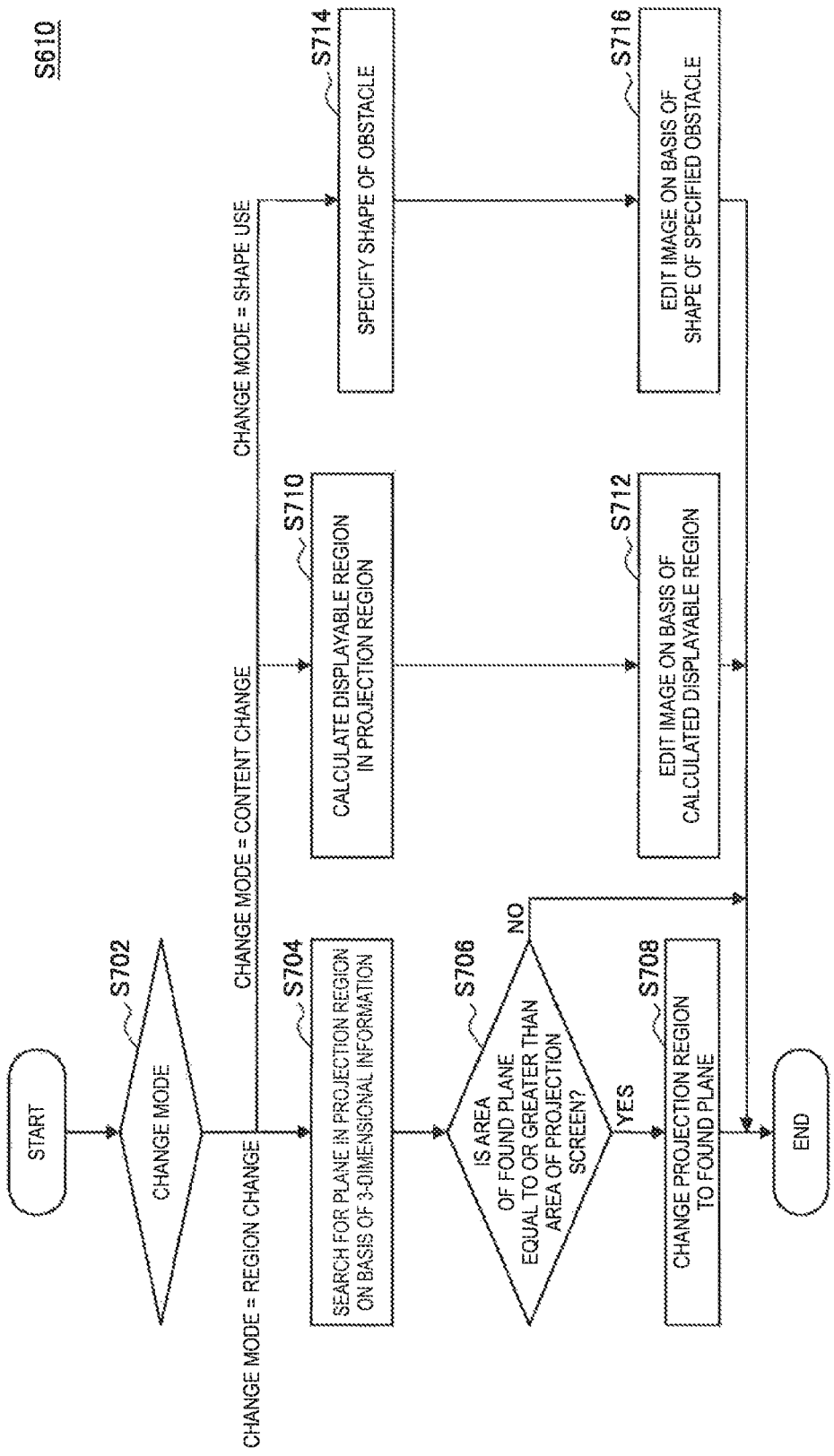
FIG. 16 is a flowchart conceptually illustrating a projection form changing process of the information processing apparatus according to the embodiment.

Next, a projection form changing process will be described in detail with reference to FIG. 16. FIG. 16 is a flowchart conceptually illustrating the projection form changing process of the information processing apparatus 100-3 according to the embodiment. Also, description of substantially the same process as the process in the first and second embodiments will be omitted.

First, the information processing apparatus 100-3 determines the change mode (step S702).

When the change mode is determined to be the region change mode, the information processing apparatus 100-3 searches for a plane in the projection region on the basis of the 3-dimensional information (step S704). Specifically, the control unit 108 causes the plane searching unit 106 to search for the plane in the projection region.

Next, the information processing apparatus 100-3 determines whether the area of the found plane is equal to or greater than the area of a projection screen (step S706). Specifically, the control unit 108 determines whether the plane specified by the plane searching unit 106 is larger than a projected image.

When the area of the found plane is determined to be equal to or greater than the area of the projection screen, the information processing apparatus 100-3 changes the projection region to the found plane (step S708). Specifically, when the specified plane is determined to be larger than the projected image, the control unit 108 decides the plane as the projection region. Also, when the plane serving as the projection region is not specified in the projection region, the projection region may not be changed, or the plane searching may be performed outside of the projection region and a plane specified through the plane searching may be decided as a new projection region.

In addition, when the change mode is determined to be the content change mode, the information processing apparatus 100-3 calculates a displayable region in the projection region (step S710). Specifically, the control unit 108 calculates a region in which there is no obstacle, that is, unevenness, in the projection region.

Next, the information processing apparatus 100-3 edits the image on the basis of the calculated displayable region (step S712). Specifically, the control unit 108 changes the layout or the like of the image so that content of the image is projected to the region in which there is no calculated unevenness.

In addition, when the change mode is determined to be shape use mode, the information processing apparatus 100-3 specifies the shape of the object (step S714). Specifically, the control unit 108 specifies the shape of the unevenness included in the projection region on the basis of the 3-dimensional information.

Next, the information processing apparatus 100-3 edits the image on the basis of the shape of the specified obstacle (step S716). Specifically, the control unit 108 changes the layout or the like of the image so that the content of the image is divided into, for example, the unevenness and the plane to be projected on the basis of the specified shape of the unevenness and the plane in the projection region.

In this way, according to the third embodiment of the present disclosure, the information processing apparatus 100-3 changes the projection form on the basis of the change in the form of the decided projection region. Therefore, even when the projection region is changed to a state inappropriate for the projection, it is possible to suppress the deterioration in visibility of the projected image.

In addition, the information processing apparatus 100-3 determines whether unevenness is included in the decided projection region on the basis of the 3-dimensional information. When the unevenness is determined to be included in the decided projection region, the projection form is changed. Therefore, when the projection region is not a plane, the projection form is changed, and thus it is possible to efficiently suppress the deterioration in the visibility of the projected image. Also, when a visual form of the projection region is changed, the control unit 108 may change the projection form so that the visual form of the projection region after the change is cancelled. As the visual form, for example, there is presence or absence of text, illustration, a pattern, or the like, texture such as gloss or quality, color, or material quality In addition, as the change in the projection form, the information processing apparatus 100-3 changes the projection region to the region in which the unevenness is not included. Therefore, by not including the unevenness in the projection region, that is, changing the projection region to the plane, the visibility of the projected image can be maintained, for example, even when an obstacle is disposed in the projection region later and unevenness occurs.

In addition, the information processing apparatus 100-3 further includes a display control unit that performs display control of an image to be projected on the basis of unevenness included in the projection region. Therefore, even when it is difficult to move the projection region to another plane, it is possible to deliver content of the projected image to the user.

In addition, as the display control, the information processing apparatus 100-3 changes the image to be projected in conformity with the shape of the unevenness. Therefore, for example, by using, for example, unevenness, the shape of an obstacle as in projection mapping or the like, it is possible to efficiently deliver content of the projected image.

Also, the projection form changing process after the decision of the projection region has been described in the foregoing embodiment. However, when a plane serving as the projection region is not specified in the plane searching at the time of decision of the projection region, the process in the content change mode or the shape use mode described above may be performed.

In addition, the example in which the process of editing an image is performed as the display control of the image has been described in the foregoing embodiment. However, the projected image may be switched to another image. For example, when the unevenness is determined to be included in the projection region, the control unit 108 switches the projection image to an image in which content of the image, for example, a display object, is not included at the position of the unevenness.

<4-3. Modification Example>

The third embodiment of the present disclosure has been described above. Also, the embodiment is not limited to the above-described example. Hereinafter, a modification example of the embodiment will be described.

As the modification example of the embodiment, the information processing apparatus 100-3 may change the projection form of an image to be projected to the projection region on the basis of a user manipulation. Specifically, the control unit 108 changes the projection form on the basis of manipulation information indicating the user manipulation supplied from the manipulation detection unit 102. For example, when a manipulation of changing the projection form is detected by the manipulation detection unit 102 and manipulation information regarding the manipulation is supplied, the control unit 108 changes the projection form in accordance with the set change mode. Also, the manipulation of changing the projection form may be an audio input or a gesture input in addition to a touch input on the information processing apparatus 100-3. In addition, manipulation content may be, for example, designation of the above-described change mode.

In this way, according to the modification example of the embodiment, the information processing apparatus 100-3 changes the projection form on the basis of the manipulation information indicating the user manipulation on the information processing apparatus 100-3. Therefore, by changing the projection form in a situation or at a timing intended by the user, it is possible to improve convenience.

<5. Fourth Embodiment (Example in Which Plane is Searched for with Movement)>

The information processing apparatus 100-3 according to the third embodiment of the present disclosure has been described above. Next, an information processing apparatus 100-4 according to a fourth embodiment of the present disclosure will be described. The information processing apparatus 100-4 performs projection or plane searching while being moved.

<5-1. Configuration of Apparatus>

Figure 17:
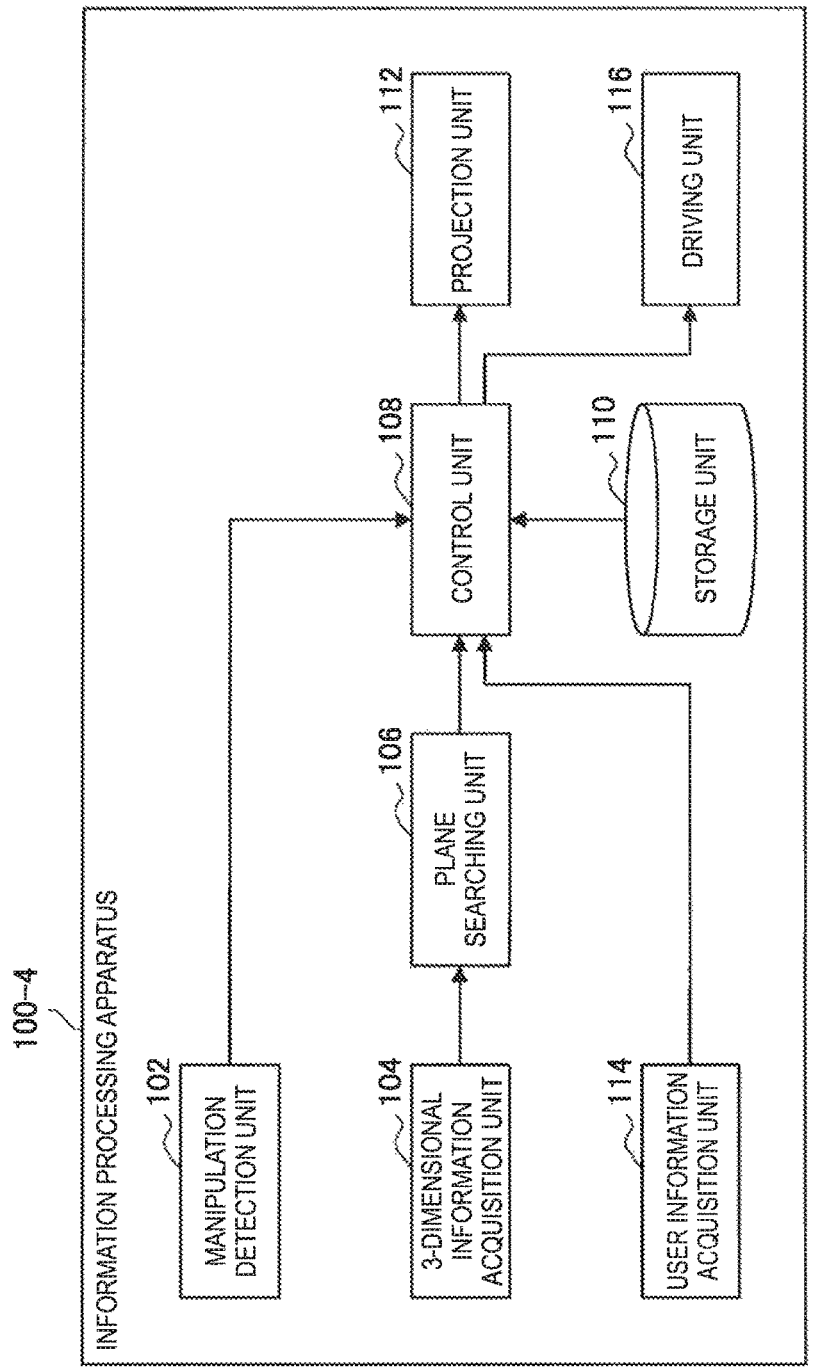
FIG. 17 is a block diagram illustrating a schematic functional configuration of an information processing apparatus according to a fourth embodiment of the present disclosure.

First, a functional configuration of the information processing apparatus 100-4 according to the fourth embodiment of the present disclosure will be described with reference to FIG. 17. FIG. 17 is a block diagram illustrating a schematic functional configuration of the information processing apparatus 100-4 according to the fourth embodiment of the present disclosure. Also, description of substantially the same configuration as the configuration of the first to third embodiments will be omitted.

As illustrated in FIG. 17, the information processing apparatus 100-4 includes a driving unit 116 in addition to the manipulation detection unit 102, the 3-dimensional information acquisition unit 104, the plane searching unit 106, the control unit 108, the storage unit 110, the projection unit 112, and the user information acquisition unit 114.

The driving unit 116 moves the information processing apparatus 100-4. Specifically, the driving unit 116 includes a power source such as a motor and an actuator such as a wheel or a caterpillar moved by the power source and operates on the basis of an instruction of the control unit 108. For example, the driving unit 116 moves the information processing apparatus 100-4 by rotating the motor for the wheel or the like in a direction related to an instruction of the control unit 108 in accordance with an output amount related to the instruction.

The control unit 108 controls an operation of the driving unit 116. Specifically, the control unit 108 instructs the driving unit 116 to perform an operation decided on the basis of movement content of the information processing apparatus 100-4. For example, the control unit 108 decides instruction content which is given to the driving unit 116 and indicates an operation direction and an operation amount from a movement path, a movement speed, and the like decided separately. Then, the control unit 108 notifies the driving unit 116 of the instruction content and gives an operation instruction to the driving unit 116.

In addition, the control unit 108 decides the movement content of the information processing apparatus 100-4. Specifically, the control unit 108 decides a movement path, a movement speed, and the like of the information processing apparatus 100-4 for acquiring the 3-dimensional information. For example, the control unit 108 decides a movement path so that the information processing apparatus 100-4 is moved toward a region in which the 3-dimensional information is not acquired.

Also, the movement path may be updated during the movement of the information processing apparatus 100-4. In addition, when the 3-dimensional information is acquired by the 3-dimensional information acquisition unit 104 once and subsequently there is a region in which the 3-dimensional information is not acquired, the control unit 108 may decide a movement path toward the region.

<5-2. Process of Apparatus>

A process related to image projection of the information processing apparatus 100-4 according to the embodiment is substantially the same as the process of the information processing apparatus 100 according to the first to third embodiments. Therefore, the description of the process will be omitted.

In this way, according to the fourth embodiment of the present disclosure, the information processing apparatus 100-4 further includes the driving unit that moves the information processing apparatus 100-4 and is moved toward a region in which the 3-dimensional information is not acquired through an operation of the driving unit. Therefore, since it is possible to acquire the 3-dimensional information which is difficult to acquire at a position at which the information processing apparatus 100-4 is positioned by the user, it is possible to broadly search for a plane which can serve as a projection region. As a result, by projecting an image to a more appropriate plane, it is possible to further improve the visibility of the projected image.

Also, the example in which the information processing apparatus 100-4 is moved by the wheel or the like has been described in the foregoing embodiment, but the information processing apparatus 100-4 may be moved in the air. For example, the driving unit 116 includes an actuator such as a propeller rotated by the power source and obtains a lift force through an operation of the propeller or the like to aviate the information processing apparatus 100-4.

<5-3. Modification Example>

The fourth embodiment of the present disclosure has been described above. Also, the embodiment is not limited to the above-described example. Hereinafter, a modification example of the embodiment will be described.

As the modification example of the embodiment, a portion including the driving unit 116 of the information processing apparatus 100-4 is separated and the separated portion may perform a part of the process and movement. Specifically, other functions of the projection unit 112 and the driving unit 116 (hereinafter referred to as a driving portion) are separated and the driving portion performs movement and projection of an image.

For example, the projection unit 112 included in the driving portion acquires an image through the other functions which are separated, for example, communication from the control unit 108, and projects the acquired image. Also, the projection unit 112 included in the driving portion can be a so-called pico-projector that is smaller than a general projector. In addition, the communication is performed in a wired or wireless manner. In addition, the driving portion may include the 3-dimensional information acquisition unit 104 in addition to or instead of the projection unit 112.

In this way, according to the modification example of the embodiment, some of the functions and the driving unit 116 of the information processing apparatus 100-4 are separated from other functions and the separated portion performs a process related to the projection of an image while being moved. Therefore, by separating some of the functions including the driving unit 116 of the information processing apparatus 100-4, it is possible to reduce the weight of the configuration related to the movement and suppress power consumption or the like.

<6. Hardware Configuration of Information Processing Apparatus According to Embodiment of Present Disclosure>

Hereinabove, the information processing apparatus 100 according to each of the embodiments according to the present disclosure has been described. The processing of the information processing apparatus 100 described above is realized by cooperation between software and hardware of the information processing apparatus 100 described below.

Figure 18:
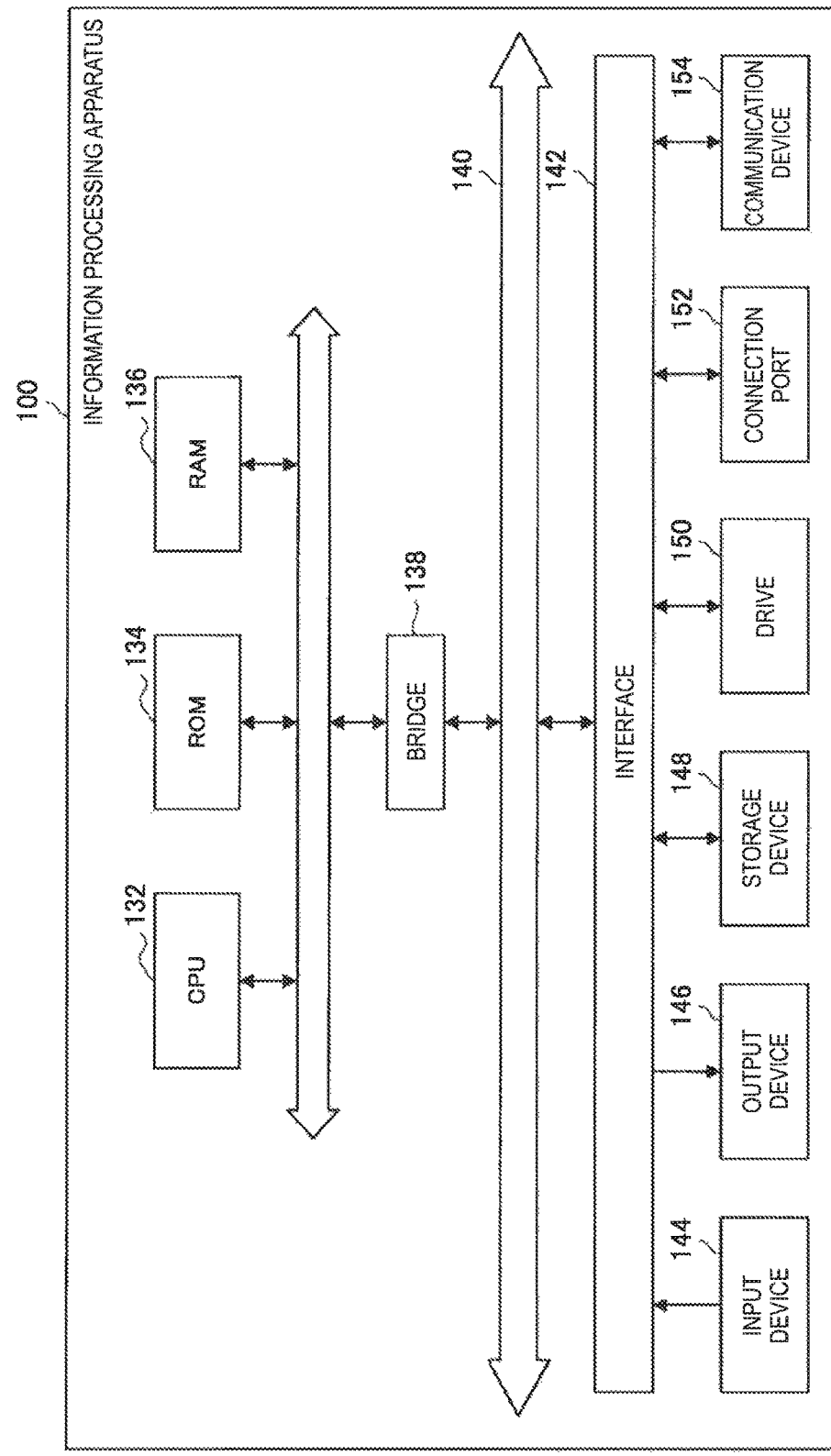
FIG. 18 is an explanatory view illustrating a hardware configuration of the information processing apparatus according to the present disclosure.

FIG. 18 is an explanatory view illustrating a hardware configuration of the information processing apparatus 100 according to the present disclosure. As illustrated in FIG. 18, the information processing apparatus 100 includes a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing unit and cooperates with various programs to realize operation of the 3-dimensional information acquisition unit 104, the plane searching unit 106, the control unit 108, and the user information acquisition unit 114 in the information processing apparatus 100. The CPU 132 may be a microprocessor. The ROM 134 stores programs, operation parameters, or the like to be used by the CPU 132. The RAM 136 temporarily stores programs for use in execution of the CPU 132, parameters that change as appropriate in the execution, and the like. A part of the storage unit 110 in the information processing apparatus 100 is realized by the ROM 134 and the RAM 136. The CPU 132, the ROM 134, and the RAM 136 are connected to one another via an internal bus constituted of a CPU bus or the like.

The input device 144 includes, for example, input means for allowing a user to input information, such as a mouse, a keyboard, a touch panel, a button, a 1.0 microphone, a switch, and a lever, and an input control circuit such as the manipulation detection unit 102 for generating an input signal on the basis of input by the user and outputting the signal to the CPU 132. The user of the information processing apparatus 100 can operate the input device 144 to input various types of data to the information processing apparatus 100 or instruct the information processing apparatus 100 to perform processing operation.

The output device 146 is an example of the projection unit 112 of the information processing apparatus 100 and performs an output to an apparatus, for example, a projector apparatus, a liquid crystal display (LCD) apparatus, an organic light emitting diode (OLED) apparatus, or a lamp. Further, the output device 146 may output audio of a speaker, a headphone, or the like or may output a driving force as an example of the driving unit 116 of the information processing apparatus 100.

The storage device 148 is a device for storing data. The storage device 148 may include a storage medium, a recording device for recording data on the storage medium, a reading device for reading the data from the storage medium, a deleting device for deleting the data recorded on the storage medium, and the like. The storage device 148 stores programs executed by the CPU 132 and various types of data.

The drive 150 is a reader-writer for a storage medium and is provided inside or externally attached to the information processing apparatus 100. The drive 150 reads information recorded on a removable storage medium that is attached thereto, such as a magnetic disk, an optical disk, a magneto-optical disk, or a semiconductor memory, and then outputs the information to the RAM 134. The drive 150 can also write information to the removable storage medium.

The connection port 152 is a bus to be connected to, for example, an information processing apparatus or peripheral device provided outside the information processing apparatus 100. The connection port 152 may be a universal serial bus (USB).

The communication device 154 is, for example, a communication interface configured as a communication device connected to a network. In addition, the communication device 154 may be a communication device corresponding to a wireless local area network (LAN) or may be a communication device corresponding to Long Term Evolution (LTE).

<7. Conclusion>

According to the first embodiment of the present disclosure, by projecting an image while avoiding an object, it is possible to project an image to an appropriate projection destination while reducing work of a user in projection of the image.

In addition, according to the second embodiment of the present disclosure, by deciding the projection region on the basis of a user viewing a projected image, the image is projected to a position at which visibility for the user can be easily ensured, and thus it is possible to improve satisfaction of the user.

In addition, according to the third embodiment of the present disclosure, even when a projection region is changed to a state inappropriate for projection, it is possible to suppress deterioration in visibility of a projected image.

In addition, according to the fourth embodiment of the present disclosure, by acquiring 3-dimensional information which is difficult to acquire at a position at which the information processing apparatus 100-4 is positioned by a user, it is possible to broadly search for a plane which serves as a projection region. As a result, by projecting an image to a more appropriate plane, it is possible to further improve the visibility of the projected image.

The preferred embodiments) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a 3-dimensional information acquisition unit configured to acquire 3-dimensional information indicating disposition of an object; and
a projection control unit configured to decide a projection region to which an image is projected in a space in which the object is disposed on the basis of the 3-dimensional information acquired by the 3-dimensional informations acquisition unit.

(2)
The information processing apparatus according to (1),
in which the projection control unit decides the projection region from a plane specified on the basis of the 3-dimensional information.

(3)
The information processing apparatus according to (2),
in which the projection control unit decides the projection region on the basis of a size of the specified plane.

(4)
The information processing apparatus according to (2),
in which the projection control unit decides the plane specified earlier than the other plane as the projection region.

(5)
The information processing apparatus according to (2),
in which the projection control unit decides the projection region from the specified plane on the basis of information regarding a user in the space.

(6)
The information processing apparatus according to (5),
in which the information regarding the user includes user position information indicating a position of the user in the space, and
the projection control unit decides the projection region on the basis of a relation between the position of the user indicated by the user position information and the position of the specified plane.

(7)
The information processing apparatus according to (5) or (6),
in which the information regarding the user includes number-of-users information that changes in accordance with the number of users in the space, and
the projection control unit decides the projection region on the basis of the number-of-users information (8)
The information processing apparatus according to any one of (5) to (7),
in which the information regarding the user includes visual line information that changes in accordance with a visual line of the user, and
the projection control unit decides the projection region on the basis of the visual line of the user estimated using the visual line information and the position of the specified plane.

(9)
The information processing apparatus according to any one of (5) to (8), further including:
a user identification unit configured to identify the user,
in which the projection control unit decides the projection region on the basis of attribute information of the user identified by the user identification unit.

(10)
The information processing apparatus according to (9),
in which the attribute information includes information indicating whether a user is a manipulation user, and
in a case where the attribute information indicates that the user is a manipulation user, the projection control unit decides the projection region on the basis of the information regarding the user who is the manipulation user.

(11)
The information processing apparatus according to any one of (2) to (10),
in which the projection control unit decides the projection region on the basis of a form appearing on the specified plane.

(12)
The information processing apparatus according to any one of (1)to (11),
in which the projection control unit performs correction on an image to be projected on the basis of a position of the decided projection region.

(13)
The information processing apparatus according to any one of (l) to (12),
in which the projection control unit changes a projection form on the basis of a change in a form of the decided projection region.

(14)
The information processing apparatus according to (13),
in which the projection control unit determines whether unevenness is included in the decided projection region on the basis of the 3-dimensional information, and in a case where the projection control unit determines that unevenness is included in the decided projection region, the projection control unit changes the projection form.

(15) The information processing apparatus according to (14), in which the projection control unit changes the projection region to a region in which the unevenness is not included.

(16) The information processing apparatus according to (14), further including:
a display control unit configured to perform display control of an image to be projected on the basis of the unevenness included in the projection region.

(17) The information processing apparatus according to (16), in which the display control unit changes the image to be projected in conformity with a shape of the unevenness.

(18) The information processing apparatus according to any one of (1) to (17), further including:
an image projection region,
in which, in a case where the projection region is not decided on the basis of the 3-dimensional information, the projection control unit decides the image projection region as the projection region.

(19) An information processing method including:
acquiring, by a 3-dimensional information acquisition unit, 3-dimensional information indicating disposition of an object; and
deciding a projection region to which an image is projected in a space in which the object is disposed on the basis of the 3-dimensional information acquired by the 3-dimensional information acquisition unit.

(20) A program causing a computer to perform:
a 3-dimensional information acquisition function of acquiring 3-dimensional information indicating disposition of an object; and
a projection control function of deciding a projection region to which an image is projected in a space in which the object is disposed on the basis of the 3-dimensional information acquired by the 3-dimensional information acquisition function.

REFERENCE SIGNS LIST 100 information processing apparatus
102 manipulation detection unit
104 3-dimensional information acquisition unit
106 plane searching unit
108 control unit
110 storage unit
112 projection unit
114 user information acquisition unit
116 driving unit

The invention claimed is:

1. An information processing apparatus comprising:
a 3-dimensional information acquisition unit configured to acquire 3-dimensional information indicating disposition of an object; and
a projection control unit configured to decide a projection region to which an image is projected in a space in which the object is disposed based on the 3-dimensional information acquired by the 3-dimensional information acquisition unit,
wherein the projection control unit decides the projection region in the space in which the object is disposed in accordance with a determined mode of the information processing apparatus,
wherein the determined mode is selected from among a region change mode, a content change mode, and a shape use mode,
wherein, when the region change mode is selected, the projection control unit decides the projection region as a plane in which no unevenness is included,
wherein, when the content change mode is selected, the projection control unit changes a layout of the image so that content of the image is not projected to a position of unevenness within the projection region,
wherein, when the shape use mode is selected, the projection control unit edits the layout of the image in conformity with a shape of unevenness within the projection region, and
wherein the 3-dimensional information acquisition unit and the projection control unit are each implemented via at least one processor.

2. The information processing apparatus according to claim 1,
wherein, when the region change mode is selected, the projection control unit decides the plane specified based on the 3-dimensional information.

3. The information processing apparatus according to claim 2,
wherein the projection control unit decides the projection region based on a size of the specified plane.

4. The information processing apparatus according to claim 2,
wherein the projection control unit decides the plane specified earlier than another plane as the projection region.

5. The information processing apparatus according to claim 2,
wherein the projection control unit decides the projection region from the specified plane based on information regarding a user in the space.

6. The information processing apparatus according to claim 5,
wherein the information regarding the user includes user position information indicating a position of the user in the space, and
wherein the projection control unit decides the projection region based on a relation between the position of the user indicated by the user position information and the position of the specified plane.

7. The information processing apparatus according to claim 5,
wherein the information regarding the user includes number-of-users information that changes in accordance with the number of users in the space, and
wherein the projection control unit decides the projection region based on the number-of-users information.

8. The information processing apparatus according to claim 5,
wherein the information regarding the user includes visual line information that changes in accordance with a visual line of the user, and
wherein the projection control unit decides the projection region based on the visual line of the user estimated using the visual line information and the position of the specified plane.

9. The information processing apparatus according to claim 5, further comprising:

a user identification unit configured to identify the user,
wherein the projection control unit decides the projection region based on attribute information of the user identified by the user identification unit, and
wherein the user identification unit is implemented via at least one processor.

10. The information processing apparatus according to claim 9,
wherein the attribute information includes information indicating whether a user is a manipulation user, and
wherein, in a case where the attribute information indicates that the user is a manipulation user, the projection control unit decides the projection region based on the information regarding the user who is the manipulation user.

11. The information processing apparatus according to claim 2,
wherein the projection control unit decides the projection region based on a form appearing on the specified plane.

12. The information processing apparatus according to claim 1,
wherein the projection control unit performs correction on an image to be projected based on a position of the decided projection region.

13. The information processing apparatus according to claim 1,
wherein the projection control unit is further configured to change a projection form of the projected image based on a change in a form of the decided projection region.

14. The information processing apparatus according to claim 13,
wherein the projection control unit determines whether unevenness is included in the decided projection region based on the 3-dimensional information, and
wherein, in a case where the projection control unit determines that unevenness is included in the decided projection region, the projection control unit changes the projection form of the projected image.

15. The information processing apparatus according to claim 1,
wherein the projection control unit adds an image projection region in a projection direction oriented toward the information processing apparatus as a candidate for the projection region.

16. An information processing method, executed by at least one processor, the method comprising:
acquiring, by a 3-dimensional information acquisition unit of the at least one processor, 3-dimensional information indicating disposition of an object; and
deciding a projection region to which an image is projected in a space in which the object is disposed based on the 3-dimensional information acquired by the 3-dimensional information acquisition unit,
wherein the projection region is decided in the space in which the object is disposed in accordance with a determined mode,
wherein the determined mode is selected from among a region change mode, a content change mode, and a shape use mode,
wherein, when the region change mode is selected, the projection region is decided as a plane in which no unevenness is included,
wherein, when the content change mode is selected, a layout of the image is changed so that content of the image is not projected to a position of unevenness within the projection region, and
wherein, when the shape use mode is selected, the layout of the image is edited in conformity with a shape of unevenness within the projection region.

17. A non-transitory computer-readable medium having embodied thereon a program, which when executed by a computer, causes the computer to perform a method, the method comprising:
acquiring 3-dimensional information indicating disposition of an object; and
deciding a projection region to which an image is projected in a space in which the object is disposed based on the 3-dimensional information acquired by the 3-dimensional information acquisition function,
wherein the projection region is decided in the space in which the object is disposed in accordance with a determined mode,
wherein the determined mode is selected from among a region change mode, a content change mode, and a shape use mode,
wherein, when the region change mode is selected, the projection region is decided as a plane in which no unevenness is included,
wherein, when the content change mode is selected, a layout of the image is changed so that content of the image is not projected to a position of unevenness within the projection region, and
wherein, when the shape use mode is selected, the layout of the image is edited in conformity with a shape of unevenness within the projection region.

* * * * *